United States Patent
Okazaki et al.

(10) Patent No.: US 7,158,657 B2
(45) Date of Patent: Jan. 2, 2007

(54) FACE IMAGE RECORDING SYSTEM

(75) Inventors: Akio Okazaki, Yokohama (JP); Toshio Sato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 642 days.

(21) Appl. No.: 10/153,641

(22) Filed: May 24, 2002

(65) Prior Publication Data

US 2002/0176610 A1 Nov. 28, 2002

(30) Foreign Application Priority Data

May 25, 2001 (JP) ............................. 2001-157192
May 14, 2002 (JP) ............................. 2002-138757

(51) Int. Cl.
*G06K 9/00* (2006.01)

(52) U.S. Cl. ...................................... 382/118; 382/203

(58) Field of Classification Search ................ 382/118, 382/203
See application file for complete search history.

(56) References Cited

U.S. PATENT DOCUMENTS

| | | | |
|---|---|---|---|
| 4,975,969 A * | 12/1990 | Tal | 382/116 |
| 5,012,522 A * | 4/1991 | Lambert | 382/118 |
| 5,864,630 A * | 1/1999 | Cosatto et al. | 382/103 |
| 6,111,517 A * | 8/2000 | Atick et al. | 340/5.83 |
| 6,181,806 B1 * | 1/2001 | Kado et al. | 382/118 |
| 6,411,209 B1 * | 6/2002 | Lyons et al. | 340/541 |
| 6,690,414 B1 * | 2/2004 | Lyons et al. | 348/156 |
| 6,882,741 B1 * | 4/2005 | Dobashi et al. | 382/118 |
| 6,885,760 B1 * | 4/2005 | Yamada et al. | 382/118 |
| 2001/0031072 A1 | 10/2001 | Dobashi et al. | |
| 2002/0071033 A1 * | 6/2002 | Gutta et al. | 348/143 |
| 2002/0191817 A1 | 12/2002 | Sato et al. | |
| 2003/0039380 A1 | 2/2003 | Sukegawa et al. | |
| 2003/0185423 A1 | 10/2003 | Dobashi | |
| 2003/0206645 A1 | 11/2003 | Okazaki et al. | |

FOREIGN PATENT DOCUMENTS

| | | |
|---|---|---|
| JP | 7-312711 | 11/1995 |
| JP | 10-134188 | 5/1998 |
| JP | 11-167632 | 6/1999 |
| JP | 11-175718 | 7/1999 |
| JP | 11-191856 | 7/1999 |
| JP | 11-316836 | 11/1999 |

OTHER PUBLICATIONS

Yamaguchi et al., "Face Recognition System Using Temporal Image Sequence," Technical Report of IEICE PROM97-50, Jun. 1997, pp. 17-24.

Fukui et al., "Facial Feature Point Extraction Method Based on Combination of Shape Extraction Pattern Matching," Journal of IEICE D-II, vol. J-80-D-II, No. 8, Aug. 1997, pp. 2170-2177.

U.S. Appl. No. 10/205,359, filed Jul. 26, 2002, Dobashi.

(Continued)

*Primary Examiner*—Jingge Wu
*Assistant Examiner*—Aaron Carter
(74) *Attorney, Agent, or Firm*—Pillsbury Winthrop Shaw Pittman, LLP

(57) ABSTRACT

In a face image recording apparatus, a camera photographs the face of a person a plurality of number of times, a processor extracts at least one high-quality image from the plurality of images photographed by the camera, and this high-quality image extracted by the processor is recorded in a memory.

27 Claims, 20 Drawing Sheets

OTHER PUBLICATIONS

U.S. Appl. No. 10/226,329, filed Aug. 23, 2002, Sukegawa et al.

European Search Report dated Jul. 3, 2006 for Appln. No. 02011552.3-2218.

"Open Source Computer Vision Library" 2000, INTEL Corporation, USA, XP002376488; Chapter 2; p. 1—Chapter 2 p. 23.

Konew W. et al.; "Zn-Face: A System for Access Control Using Automated Face Recognition"; International Workshop on Automati Face-and Gesture-recognition: Jun. 26, 1995; pp. 18-23; XP 000675537.

Gong et al; Dynamic Vision: From Images to Face recognition: 2000; Imperial College Press, London, XP002380777.

* cited by examiner

FACE IMAGE RECORDING SYSTEM

CROSS-REFERENCE TO RELATED APPLICATIONS

This application is based upon and claims the benefit of priority from the prior Japanese Patent Applications No. 2001-157192, filed May 25, 2001; and No. 2002-138757, filed May 14, 2002, the entire contents of both of which are incorporated herein by reference.

BACKGROUND OF THE INVENTION

1. Field of the Invention

The present invention relates to a face image recording system applied to doorway monitoring in a facility to record a user's face image as log data.

2. Description of the Related Art

In conventional doorway monitoring for a specific room, it is necessary to check whether a person who wants to enter or leave the room is permitted to do so. For example, a doorway monitoring system for managing entrance/leaving with respect to a specific room identifies a person by various identification methods, thereby checking whether the person is permitted to enter or leave the room. Also, in electronic commerce it is necessary to check whether a person who has accessed has a legal qualification. For example, an information management system used in electronic commerce confirms a person by identifying him or her by various identification methods.

For this reason, a doorway monitoring system or an information management system is desired to be able to mechanically (automatically) identify a person with no or minimum intervention of a third party.

The conventional person identification methods are roughly classified into the following three methods.

(1) Person Identification Method Using Person's Belongings

A person identification method using person's belongings is to identify a person by his or her identification card such as a passport or license. This person identification method using person's belongings also includes a method of identifying a person by using a storage medium such as a magnetic card, wireless card, or IC card. In a broad sense, the door keys of an entrance and a safe, and the ignition key of a car are also included in the person identification method using person's belongings.

(2) Person Identification Method Using Stored Information (PIN; Personal Identification Number)

For example, a person identification method using information such as a password belongs to this person identification method using stored information. This person identification method using stored information is often combined with the person identification method using person's belongings. As an example, a financial agency such as a bank identifies a user by combining a credit card with a password of four figures stored by the user.

(3) Person Identification Method Using Biomedical Features

A representative example of this person identification method using biomedical features is fingerprint collation. A person can also be identified by using biomedical features (biometrics) such as a retina, iris, palm shape, voiceprint, signature (handwriting), and face. Person identification methods using a fingerprint, voiceprint, and signature have been conventionally used in crime investigation. These person identification methods using biomedical features identify a person by collation with sample data. Also, these person identification methods using biomedical features are not always mechanically performed. For example, in a person identification method using a credit card, a person is identified by visually collating a signature on the card with a signature written by the person. That is, the person identification method using biomedical features is often combined with (1) the person identification method using person's belongings and (2) the person identification method using stored information.

Unfortunately, the conventional person identification methods described above are imperfect since they have the following problems.

The drawback of (1) the person identification method using person's belongings is that a belonging for identifying a person can be lost, stolen, or forged. The drawback of (2) the person identification method using stored information is that a person may forget stored information such as a password, or stored information may be estimated or randomly attacked by another person. The drawback of (3) the person identification method using biomedical features is that influences such as changes in biomedical features over time are unavoidable, so collation errors cannot be completely eliminated.

In addition, in doorway monitoring it is sometimes necessary to save information indicating a person who has entered or left. Also, in electronic commerce it is sometimes necessary to save information indicating that a person has approved. In Japan, for example, impressing a seal indicating the name or the like of a person is customarily performed to indicate his or her approval. In a purpose like this which requires a relatively low security level, a certain security can be maintained by saving information indicating person's approval.

If the conventional person authentication method is applied to such a purpose requiring a relatively low security level, installation of the system increases the cost, or the operability worsens. Accordingly, a system which can reduce the installation cost while maintaining a certain security level and which is user-friendly is demanded.

BRIEF SUMMARY OF THE INVENTION

It is an object of the present invention to provide a face image recording apparatus, face image recording system, information management system, face image recording method, and information management method which minimize the system installation cost while maintaining a security level meeting an intended use, and which realize highly "convenient" person authentication which is readily used by a user.

A face image recording apparatus of the present invention records a person's face image, and comprises a camera which photographs the face of a person a plurality of number of times, a processor which extracts at least one high-quality face image from the plurality of face images photographed by the camera, and a memory which records the high-quality face image extracted by the processor.

A face image recording apparatus of the present invention records a person's face image, and comprises a camera which photographs the face of a person a plurality of number of times, a feature amount extractor which extracts a face feature amount from each image photographed by the camera, and a memory which records at least one image from which the face feature amount is extracted by the feature amount extractor.

A face image recording apparatus of the present invention stores a person's face image, and comprises a first memory in which a feature amount of the face of a person whose face image need not be recorded is registered beforehand, a camera which photographs the face of a person a plurality of number of times, a feature amount extractor which extracts a face feature amount from each image photographed by the camera, a collator which collates the face feature amount extracted by the feature amount extractor with the face feature amount registered in the first memory, and a second memory which, in the case where the collation by the collator is unsuccessful, records an image which is one of the images photographed by the camera and from which the face feature amount is extracted by the feature amount extractor.

A face image recording apparatus of the present invention records a person's face image, and comprises a camera which photographs the face of a person a plurality of number of times, a feature amount extractor which extracts a face feature amount from each image photographed by the camera, a generator which generates attribute information concerning an image from which the face feature amount is extracted by the feature amount extractor, a memory which records an image from which the face feature amount is extracted by the feature amount extractor, in relation to attribute information concerning the image and generated by the generator, an input unit which inputs a search condition with respect to an image recorded in the memory, and a search unit which searches for an image recorded in the memory, on the basis of the input search condition from the input unit and the attribute information recorded in the memory.

An information management system of the present invention is a system in which at least one terminal apparatus and a management apparatus are connected, the terminal apparatus comprising a camera which photographs the face of a person a plurality of number of times, a feature amount extractor which extracts a face feature amount from each image photographed by the camera, and a transmitter which transmits to the management apparatus an image from which the face feature amount is extracted by the feature amount extractor, and the management apparatus comprising a display which displays the image transmitted from the terminal apparatus.

An information management system of the present invention comprises a first information terminal which transmits electronic information, and a second information terminal which can receive the electronic information from the first information terminal, the first information terminal comprising a camera which photographs the face of a person a plurality of number of times, a feature amount extractor which extracts a face feature amount from each image photographed by the camera, and a transmitter which transmits to the second information terminal an image from which the face feature amount is extracted by the feature amount extractor, by attaching the image to electronic information.

An information management system of the present invention comprises a first information terminal which transmits electronic information, a second information terminal which can receive the electronic information from the first information terminal, and an authentication apparatus connected to one of the first and second information terminals, the first information terminal comprising a camera which photographs the face of a person a plurality of number of times, a feature amount extractor which extracts a face feature amount from each image photographed by the camera, and a transmitter which transmits to the second information terminal an image from which the face feature amount is extracted by the feature amount extractor, by attaching the image to electronic information, and the authentication apparatus comprising a memory in which face images of a plurality of persons are recorded beforehand, a collator which collates an image attached to electronic information transmitted from the first information terminal to the second information terminal, with a face image stored in the memory, and a notification unit which, in the case where the collation by the collator is successful, notifies the second information terminal that the sender of the electronic information is authenticated, and, in the case where the collation by the collator is unsuccessful, notifies the second information terminal that the sender of the electronic information cannot be authenticated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the generation description given above and the detailed description of the preferred embodiments given below, serve to explain the principles of the invention.

DETAILED DESCRIPTION OF THE INVENTION

Embodiments of the present invention will be described below with reference to the accompanying drawing.

Figure 1:
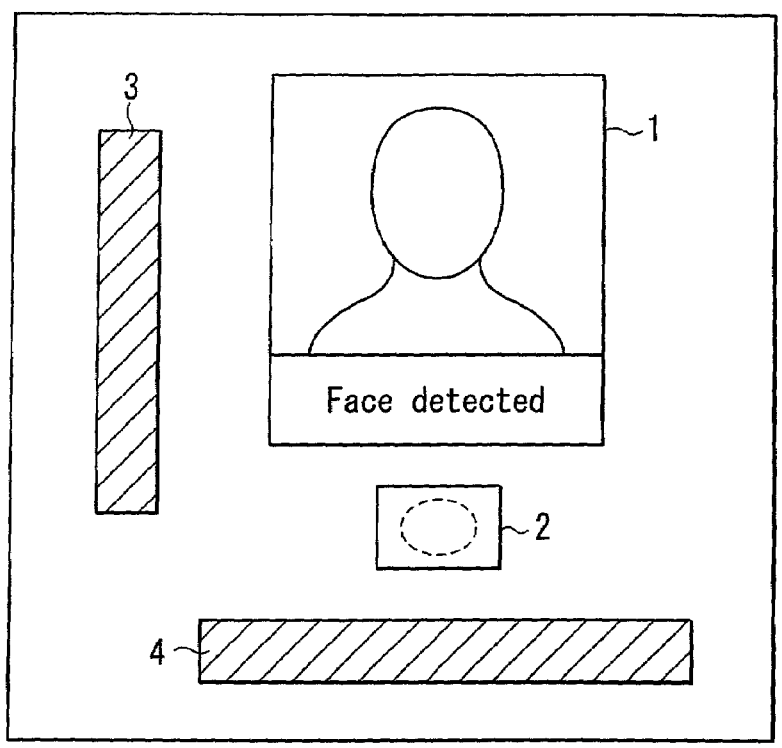
FIG. 1 is a view showing an example of the external appearance of a face image recording apparatus according to each embodiment of the present invention.
Figure 2:
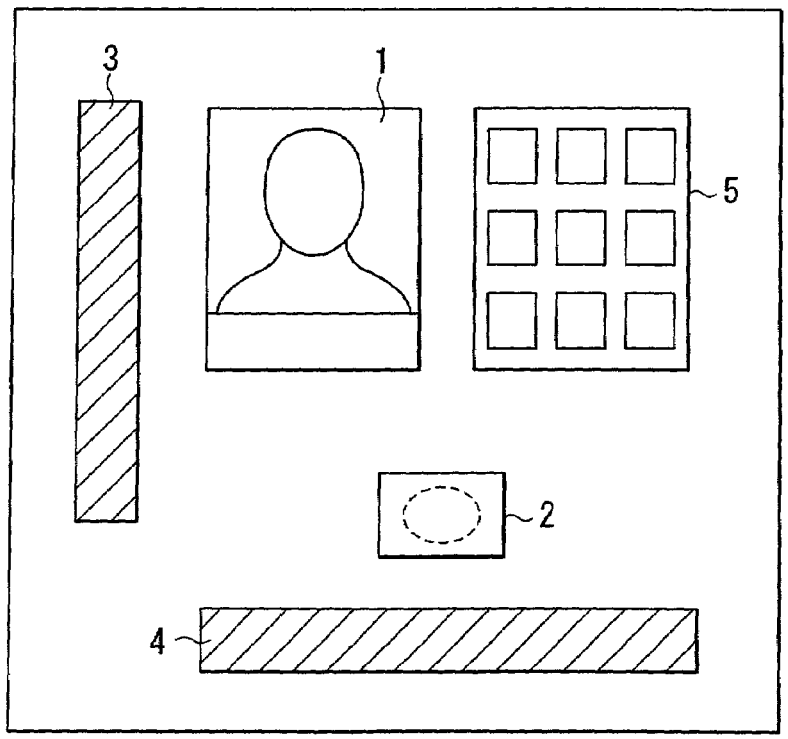
FIG. 2 is a view showing another example of the external appearance of the face image recording apparatus according to each embodiment of the present invention.

FIGS. 1 and 2 are front views showing examples of the external appearance of a user interface unit 10 of a face image recording apparatus. In the example of the face image recording apparatus shown in FIG. 1, the user interface unit 10 has a display 1, camera 2, and linear light sources 3 and 4. In the example of the face image recording apparatus shown in FIG. 2, the user interface 10 has an input unit 5 in addition to the display 1, camera 2, and linear light sources 3 and 4.

The display 1 displays an image currently being photographed by the camera 2, messages to a user, and the like. The camera 2 photographs a motion image or a continuous image. This camera 2 is provided below the display 1 and in front of the user who is looking at the display, to photograph the user's face and any objects in the vicinity thereof. The linear light source 3 laterally illuminates the face of a user in front of the camera 2 with light. The linear light source 4 illuminates, obliquely from below, the face of a user in front of the camera 2 with light. The illumination by the linear light sources 3 and 4 is unnecessary if the region where the apparatus is located is sufficiently illuminated (or illuminated enough to photograph the user's face). The input unit 5 includes a ten-key pad and the like. This input unit 5 is used by a user to input, e.g., personal ID information for specifying an individual.

Figure 3:
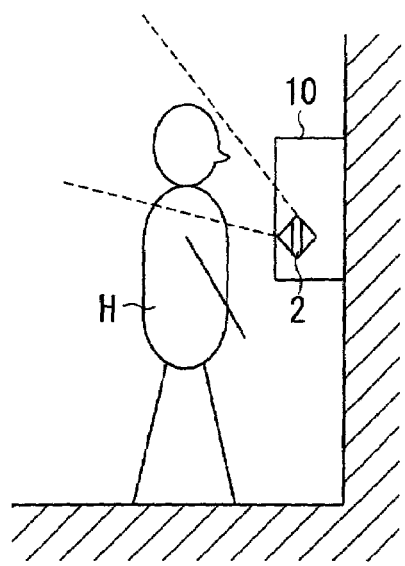
FIG. 3 is a view showing an installation example of the face image recording apparatus according to each embodiment of the present invention.
Figure 4:
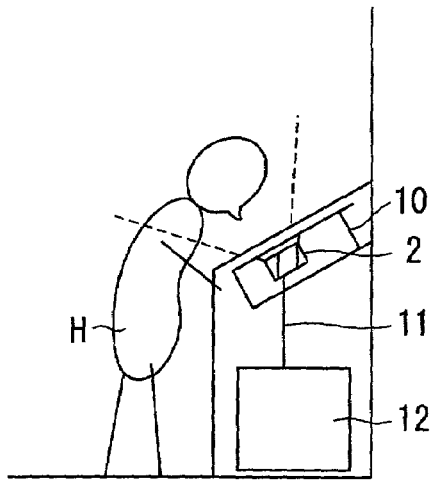
FIG. 4 is a view showing another installation example of the face image recording apparatus according to each embodiment of the present invention.

FIGS. 3 and 4 are side views showing installation examples of the face image recording apparatus.

FIG. 3 is a side view showing an installation example of the face image recording apparatus having a hanging-up-on-the-wall type user interface unit 10. Referring to FIG. 3, the user interface unit 10 configured as shown in FIG. 1 or 2 is hung on the wall. The face of a user H standing in front of this user interface unit 10 is photographed by the camera 2 from below.

FIG. 4 is a side view showing an installation example of the face image recording apparatus having a stationary type user interface unit 10. Referring to FIG. 4, the camera 2 is installed diagonally below a user H standing in front of the user interface unit 10. Therefore, the user H looks into the camera 2 from above. In this installation example shown in FIG. 4, the user interface unit 10 configured as shown in FIG. 1 or 2 of the face image recording apparatus is connected to a processing unit 12 by a cable 11.

Figure 5:
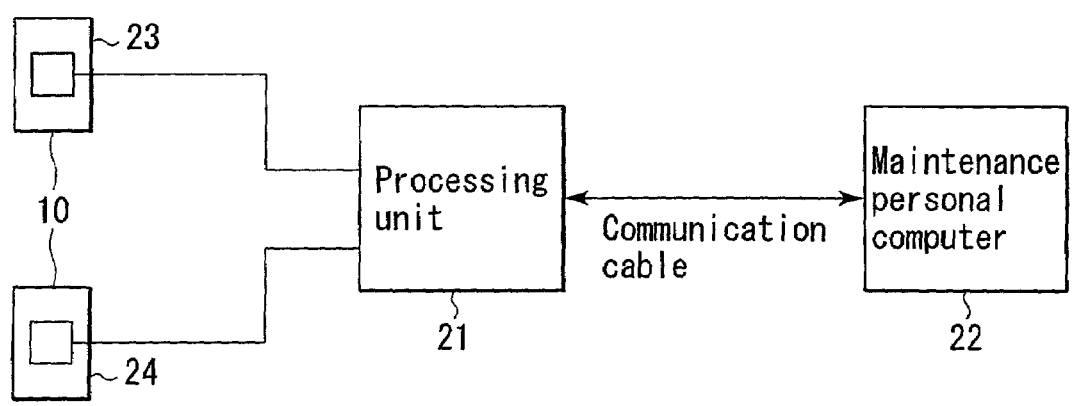
FIG. 5 is a block diagram showing an arrangement when the face image recording apparatus according to each embodiment of the present invention is applied to a room entering/leaving system.

FIG. 5 is a block diagram showing an arrangement when the user interface units 10 are installed in a plurality of locations such as doors 23 and 24. In this arrangement shown in FIG. 5, the user interface units 10 at the doors 23 and 24 are connected to a processing unit 21. This processing unit 21 is connected to a maintenance personal computer 22 via a communication cable. Note that an arrangement in which a maintenance personal computer is connected to a face image recording apparatus will be described in detail later in the third embodiment.

Figure 6:
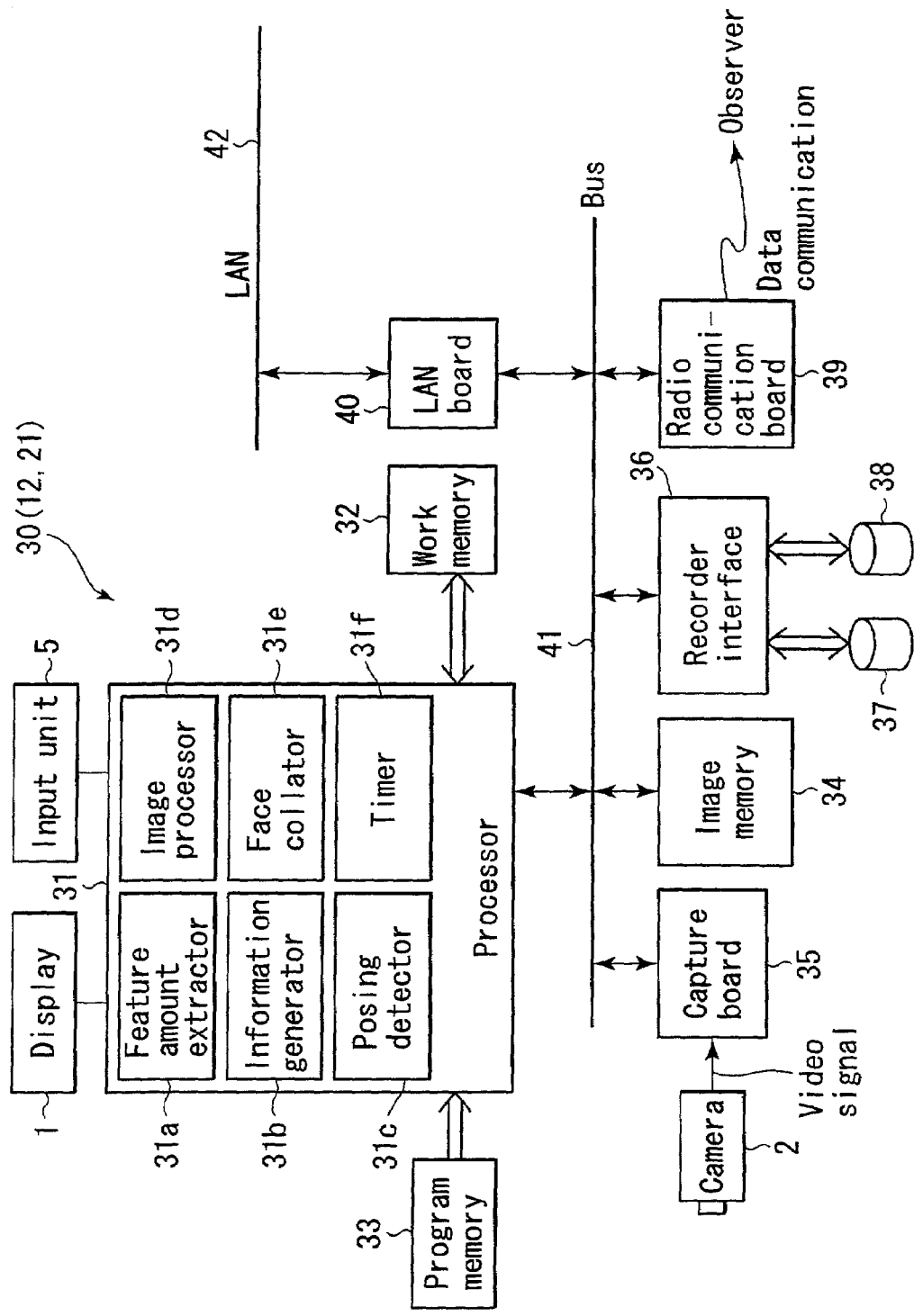
FIG. 6 is a block diagram showing the internal arrangement of the face image recording apparatus according to each embodiment of the present invention.

FIG. 6 is a block diagram showing the overall arrangement as a control system of the face image recording apparatus.

As shown in FIG. 6, a processing unit 30 (12, 21) of the face image recording apparatus includes a processor 31, work memory 32, program memory 33, image memory 34, capture board 35, recorder interface 36, recorder 37, collating dictionary 38, radio communication board 39, LAN board 40, and bus 41.

The processor 31 controls the entire face image recording apparatus. Also, this processor 31 is connected to the display 1, camera 2, and linear light sources 3 and 4 of the user interface unit 10 shown in FIG. 1 or 2 and controls these components. When the user interface unit 10 includes the input unit 5 as shown in FIG. 2, this input unit 5 is connected to the processor 31. Information input from the input unit 5 is supplied to the processor 31.

The processor 31 also has functions of a feature amount extractor 31a, information generator 31b, posing detector 31c, image processor 31d, and face collator 31e. These functions are implemented by executing control programs stored in the program memory 33 by the processor 31. The processor 31 further includes a timer 31f for counting time.

The feature amount extractor 31a extracts a face feature amount from an image photographed by the camera 2. The information generator 31b generates attribute information (e.g., the photographing time) concerning an image photographed by the camera 2. The posing detector 31c detects that an image photographed by the camera 2 represents posing by another person. A posing detecting process by this posing detector 31c will be described in detail later.

The image processor 31d performs image processing for an image photographed by the camera 2. This image processor 31d performs, e.g., a face region extraction process, image density correction process, normalization process, and image compression process for an image photographed by the camera 2. The face collator 31e collates a face feature amount extracted by the feature amount extractor 31*a* with a face feature amount stored in the face collating dictionary 38.

The work memory 32 temporarily stores an image currently being processed. The program memory 33 stores control programs and the like. The image memory 34 stores image data. This image memory 34 stores a face image photographed by the camera 2 and supplied to the processing unit 30 via the capture board 35. The capture board 35 is an interface for capturing an image photographed by the camera 2 into the processing unit 30.

The recorder interface 36 performs data read and write to the recorder 37 and to the face collating dictionary (dictionary) 38. The recorder 37 records a face image. The face collating dictionary 38 is a recording device which registers a face image or face feature pattern (feature amount) for collation.

Note that the recorder 37 and the face collating dictionary 38 may also be installed outside the processing unit 30. Note also that the recorder 37 and the face collating dictionary 38 may be installed in an external apparatus on a communication network capable of communication via a communication interface.

The radio communication board 39 is an interface for communicating with a monitor apparatus such as a personal computer for an observer. Instead of this radio communication board, a communication board which communicates with the management apparatus through wire may also be used. The LAN board 40 is an interface for connecting with a LAN 42. The bus 41 is a data bus for exchanging image data and the like. This bus 41 is connected to the processor 31, image memory 34, capture board 35, recorder interface 36, radio communication board 39, and LAN board 40.

As the camera 2, a common industrial color camera (a video camera using a CCD or CMOS image sensor) is used. In this case, the capture board 35 converts a video signal (analog data) into digital data (A/D conversion), and supplies this digital data to the image memory 34 (buffering). The processor 31 sequentially loads image data stored in the image memory 34 into the work memory 32 and performs various processes.

If a face image recorded in the recorder 37 can be a monochrome image, the camera 2 can also be a camera which photographs monochrome images. If this camera 2 includes a USB (Universal Serial Bus) interface, the capture board 35 is also given a USB interface. When this is the case, no A/D conversion circuit is necessary. Even when the camera 2 includes another digital interface such as IEEE1394, the capture board 35 can be given a corresponding interface.

When the user interface unit 10 is attached to a door as shown in FIG. 5, the processing unit 30 includes a door control mechanism for opening/closing or locking/unlocking the door. This door control mechanism is connected to the processor 31. This allows the face image recording apparatus as shown in FIG. 6 to be applied to a doorway monitoring system for controlling opening/closure of a door.

The first and second embodiments using the face image recording apparatus configured as above will be explained below.

The first embodiment will be described below.

In this first embodiment, a face image of a user is stored as log data by the face image recording apparatus configured as above. Note that the face image recording apparatus can be solely installed in this first embodiment. This face image recording apparatus will be called a standalone single function type because the apparatus has a single function of recording face images.

Figure 7:
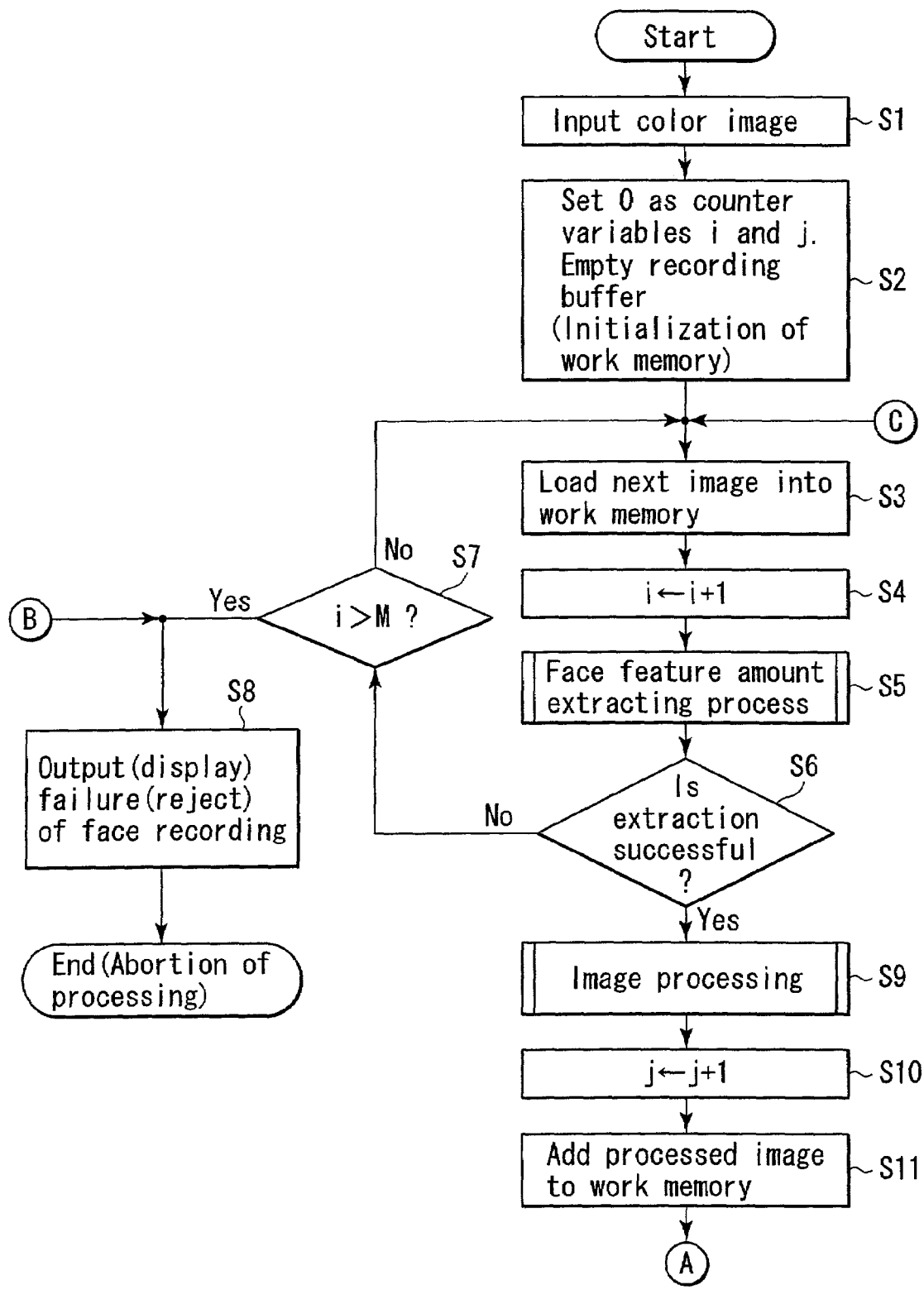
FIG. 7 is a flow chart for explaining the overall operation of the first embodiment.
Figure 8:
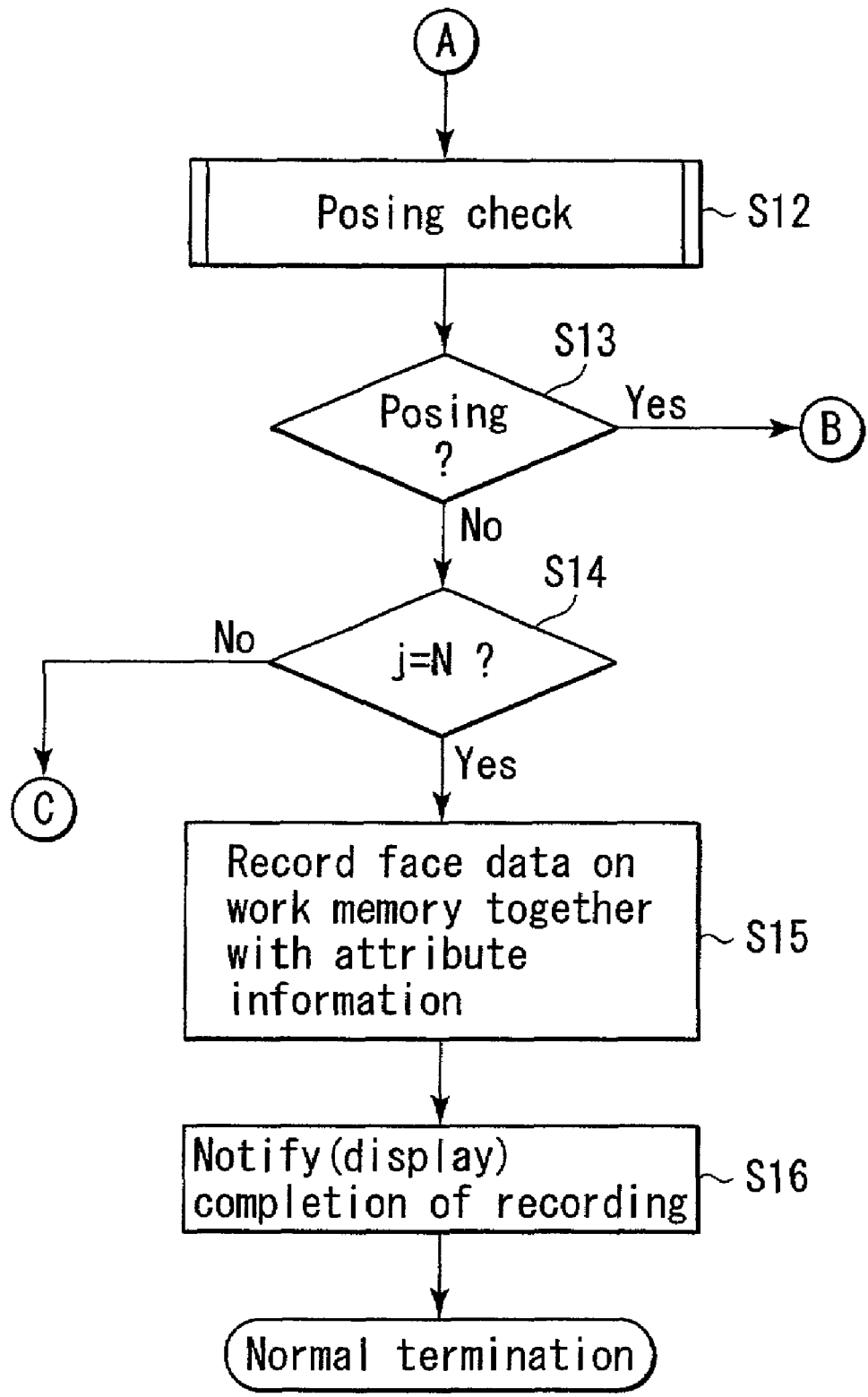
FIG. 8 is a flow chart for explaining the overall operation of the first embodiment.

FIGS. 7 and 8 are flow charts for explaining the whole flow of a face image recording process.

First, when the camera 2 photographs the face of a user, the capture board 35 sequentially stores (buffers) the color face images (digital data) from the camera 2 into the image memory 34. The processor 31 sequentially reads out these images buffered in the image memory 34 onto the work memory 32. The processor 31 extracts feature amounts from the images read out onto the work memory 32. If a face image can be extracted by this feature amount extracting process, the processor 31 records the face image.

That is, the processor 31 allows the camera 2 to continuously photograph the face of a person a plurality of number of times. The plurality of color images photographed by the camera 2 are sequentially stored in the image memory 34 (step S1). These color images stored in the image memory 34 are sequentially read out onto the work memory 32. Before reading out the images onto the work memory 32, the processor 31 initializes the work memory 32 (step S2). More specifically, the processor 31 initializes the work memory 32 by setting 0 as variables of counters i and j, and emptying a recording buffer (a recording area on the work memory). After initializing the work memory 32, the processor 31 reads out an image from the image memory 32 and loads (stores) the readout image into the work memory 32 (step S3). Whenever reading out an image from the image memory 34, the processor 31 increments the counter i by one (i=i+1) (step S4).

After loading the image into the work memory 32, the processor 31 extracts a feature amount from the image loaded into the work memory 32 (step S5). Details of this feature amount extracting process will be described later. If no face feature amount can be extracted by the feature amount extracting process (NO in step S6), the processor 31 checks whether the value of the variable i is larger than a predetermined amount M (step S7).

If determining that the value of the variable i is equal to or smaller than the predetermined value M (NO in step S7), the flow advances to step S3, and the processor 31 loads the next image into the work memory 32. If determining that the value of the variable i is larger than the predetermined value M (YES in step S7), the processor 31 aborts the face image recording process. When aborting the face image recording process, the processor 31 informs the user of the failure of face image recording by using the display 1 of the user interface unit 10 or by using a loudspeaker (not shown) (step S8).

The predetermined value M compared with the variable i designates the maximum number of face images from which no feature amount can be extracted. That is, if no feature amount can be extracted from M or more consecutive images photographed by the camera 2, the face feature amount extracting process is aborted. As a reference for aborting the face image recording process, it is also possible to designate a processing time for photographed images, instead of the number of images photographed by the camera 2. When this is the case, the processor aborts the process if there is no image from which a feature amount can be extracted within a predetermined time since the camera 2 starts photographing images of the person of interest.

If a face feature amount can be extracted in step S5 (YES in step S6), the processor 31 performs image processing for the image (step S9). This image processing will be described in detail later. The processed image is recorded in the recorder 37. The processor 31 increments the counter j by one (j=j+1) (step S10).

After incrementing the counter j by one, the processor 31 stores the processed image into the work memory 32 (step S11). The processor 31 then checks "posing" from the processed image (step S12). Although details of this "posing" check will be explained later, posing using a photograph or the like by another person is checked.

If determining by this "posing" check that there is no posing (NO in step S13), the processor 31 checks whether the value of the variable j is equal to a predetermined value N (step S14). If determining that the value of the variable j is not equal to the predetermined value N (NO in step S14), the flow returns to step S3, and the processor 31 processes the next image stored in the image memory 34.

The predetermined value N compared with the variable j indicates the number of images to be recorded. That is, this predetermined value N designates the number of images to be recorded, from which feature amounts are extracted. Instead of the number of images from which feature amounts are extracted, the image input time of the camera 2 can also be designated. That is, if a face feature amount is detected from at least one image within a predetermined time since the camera 2 starts photographing images of the person of interest, the processor 31 records this image.

If determining that the value of the variable j is equal to the predetermined value N (YES in step S14), the processor 31 records the image on the work memory 32, together with attribute information concerning the image, into the recorder 37 (step S15). The attribute information indicates, e.g., an ID number indicating the camera 2 or the face image recording apparatus which has photographed the image, or the time at which the image is photographed. If personal ID information is input from the input unit 5 or the like, the attribute information includes this personal ID information.

The contents of the attribute information are not restricted to the ID number of the apparatus which has loaded the image, the photographing time of the image, and the personal ID information. That is, the contents of the attribute information are various numerical values corresponding to an image to be recorded and text information, and are determined in accordance with the intended use.

After recording the image and the attribute information into the recorder 37, the processor 31 notifies the user of the completion of face image recording by displaying a message indicating the recording completion on the display 1 (step S16).

The face feature amount (feature point) extracting process in step 5 will be described in detail below.

Figure 9:
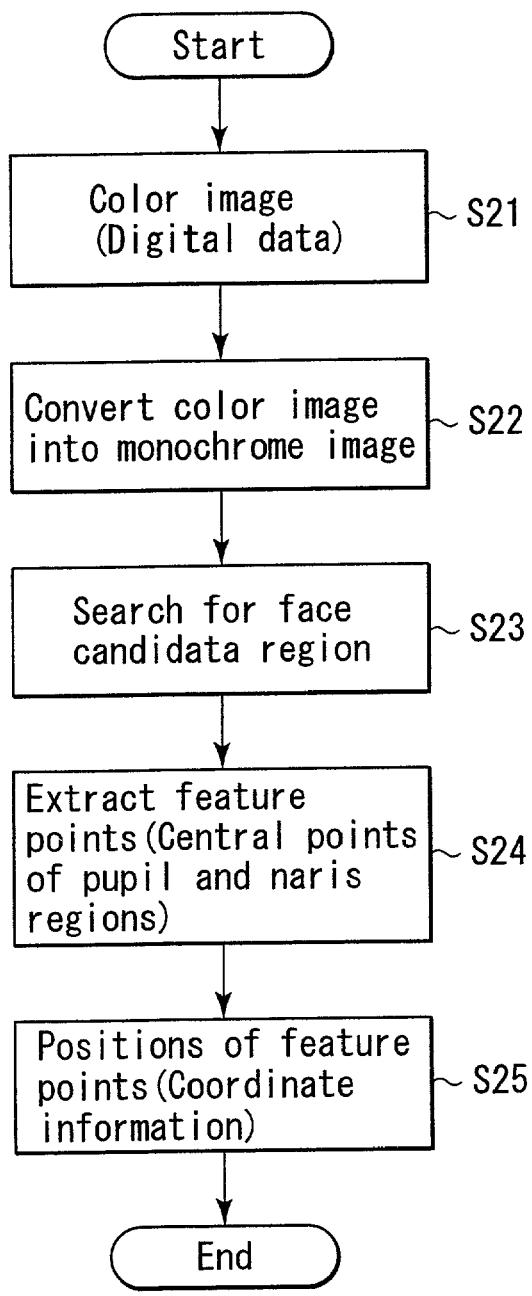
FIG. 9 is a flow chart for explaining a face feature point extracting process.

FIG. 9 is a flow chart for explaining this face feature amount extracting process.

The camera 2 photographs a plurality of continuous images or motion images at predetermined time intervals, rather than a single image (still image). This is to extract a high-quality image from a plurality of images by taking account of fluctuations in the image input conditions (photographing conditions). These images photographed by the camera 2 are transmitted to the capture board 35. The capture board 35 sequentially buffers the plurality of images from the camera 2 into the image memory 34. These images buffered in the image memory 34 are sequentially read out onto the work memory 32 and processed under the control of the processor 31 (step S21).

In the feature amount extracting process, the processor 31 first converts the face image (digital color image) on the work memory 32 into a monochrome image (step S22). From this monochrome image, a feature amount is extracted on the basis of brightness (gradation) information. If the camera 2 photographs monochrome images, this step S22 is omitted.

That is, the processor 31 searches for a face region candidate in the monochrome image obtained by the conversion (step S23). When the face region candidate is detected, the processor 31 detects pupil (iris) regions and naris regions, both of which can be regarded as substantially circular regions, as face feature amounts in the face region (step S24). After detecting the pupil (iris) regions and the naris regions, the processor 31 sets the central positions of the pupil (iris) regions and the central positions of the naris regions as feature amounts (step S25). Accordingly, the face feature amounts are detected as the position coordinates of feature points such as the central positions of the pupil (iris) regions and the central positions of the naris regions.

In this embodiment, the pupils and nares are used as feature points. However, it is also possible to use other feature points such as the end points of lips or to use only the pupils as feature points.

As the processes in steps S23 to S25 described above, it is possible to use the method described in ""Face Recognition System Using Motion Image", Technical Report of IEICE PRMU97-50, June 1997; Osamu Yamaguchi, Kazuhiro Fukui, and Kenichi Maeda" (reference 1), or ""Face Feature Point Extraction by Combination of Shape Extraction and Pattern Collation", Journal of IEICE D-II, Vol. J-80-D-II, No. 8, August 1997; Fukui and Yamaguchi" (reference 2).

The image processing in step S9 will be explained next.

Figure 10:
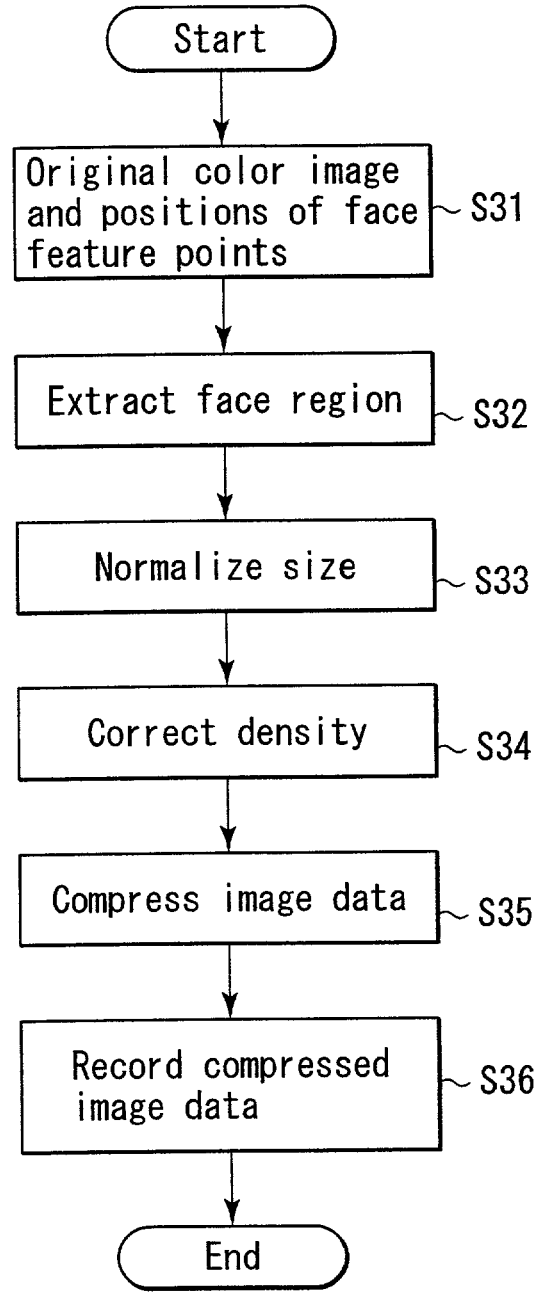
FIG. 10 is a flow chart for explaining image processing for an image to be recorded in a recorder.

FIG. 10 is a flow chart for explaining the image processing for an image from which the face feature amounts are extracted. If the face feature amounts are extracted by the face feature point extracting process in step S5, the processor 31 performs the image processing for recording the image into the recorder 37. As this image processing, a face region extraction process, normalization process, density correction process, and compression process are performed. These processes are executed by the processor 31 on the basis of the control programs stored in the program memory 33.

First, assume that the coordinate information of the central positions of the pupils and nares is obtained as feature points in the face feature amount extracting process. In this case, the processor 31 determines that the image is to be recorded in the recorder 37, and performs the image processing for this image.

That is, when coordinate information indicating the positions of the face feature points is obtained (step S31), the processor 31 performs the face region extraction process for the original color image before conversion into the monochrome image (step S32). In this face region extraction process, the processor 31 extracts the face region from the image photographed by the camera 2 on the basis of the face feature point coordinate information.

After extracting the face region, the processor 31 performs the normalization process for converting the cut face region into a predetermined recording image size (step S33). By this normalization process, the image data extracted as the face region is converted into the predetermined image size.

After normalizing the face region image, the processor 31 performs the density correction process for the normalized face image (step S34). Consequently, the density of the face region image data converted into the predetermined image size is corrected. This density-corrected image is a face image to be recorded.

After generating this face image to be recorded, the processor 31 performs the compression process for compressing the face image to be recorded (step S35). This face image compression process is to efficiently record face images by saving the capacity of the recorder 37. The face image compression process uses, e.g., JPEG as an international standard color still image compression system. After compressing the face image by the predetermined format in this face image compression process, the processor 31 records the compressed face image into the recorder 37 (step S36).

The contents of the image processing as described above are set in accordance with the intended use. For example, the face region extraction process, size normalization process, density correction process, and image data compression process as described above are selectively used where necessary. In the simplest processing, for example, if the pupils can be detected from at least one image within a predetermined time, this image in the photographed state can be recorded in the recorder 37.

In this embodiment, a color image is recorded to make the recorded image easy to see. However, a monochrome image can also be recorded. When a monochrome image is to be recorded, no color camera need be used, so the camera 2 can be a monochrome camera.

The "posing" detecting process in step S12 will be explained below.

This "posing" detecting process is to check whether a person is impersonating another person by using a face photograph or the like of the other person. "Posing" can be detected by various methods. In this embodiment, a method of detecting "posing" using a photograph or the like by detecting the motion of a person will be explained. Note that this "posing" detecting process is executed before a face image is recorded, in the whole processing as indicated by the flow chart shown in FIG. 7. Furthermore, assume that in order to perform this "posing" detecting process, a user is prompted to move his or her face in an arbitrary direction or in a predetermined direction (e.g., a direction designated on the display screen of the display 1), and this motion is photographed as a motion image or as continuous images (a plurality of images) by the camera 2.

Figure 11:
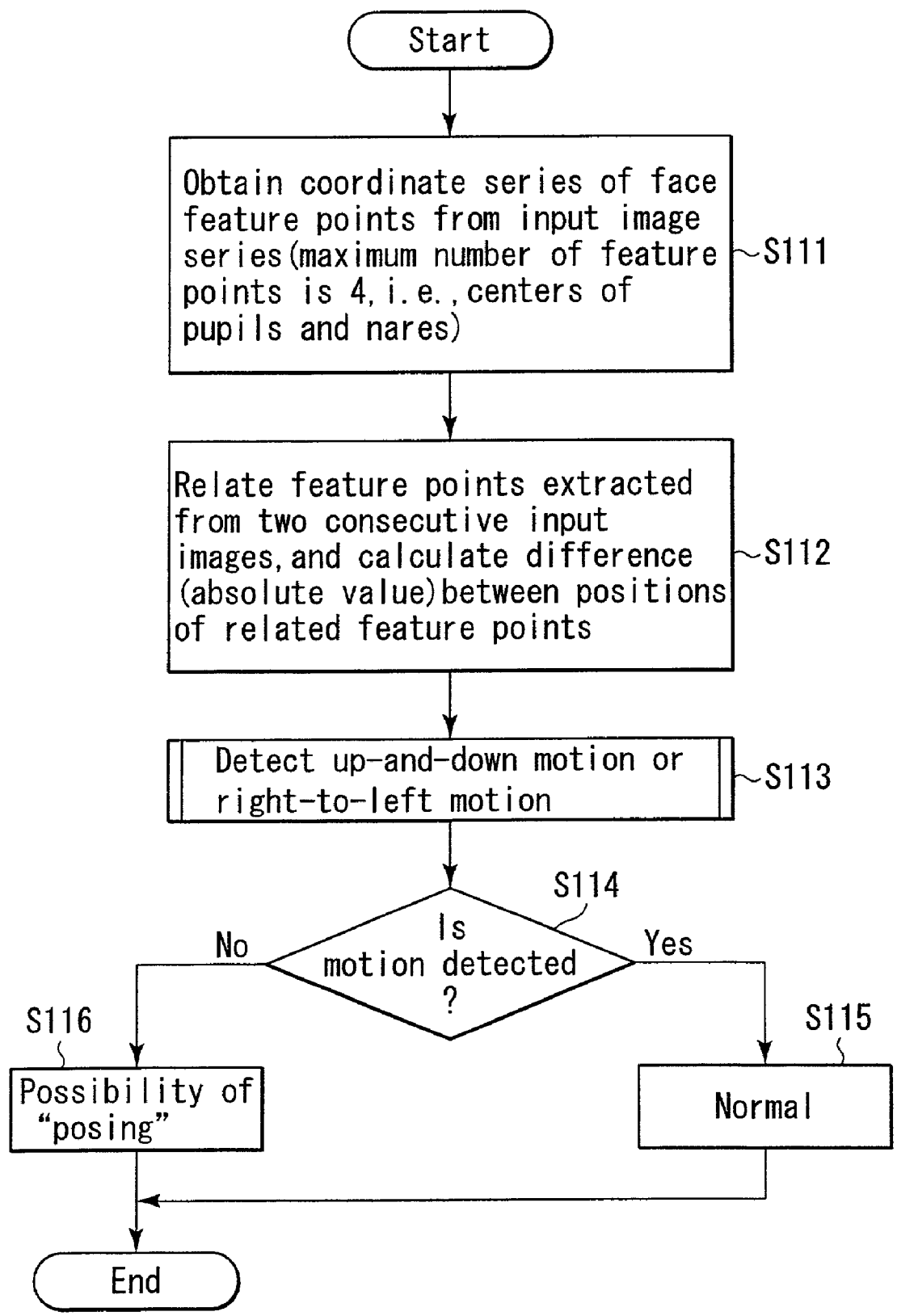
FIG. 11 is a flow chart for explaining an example of a posing detecting process.

FIG. 11 is a flow chart for explaining details of the "posing" detecting process. As shown in FIG. 11, the processor 31 calculates the position coordinates of face feature points in each of a plurality of images (time series images) obtained by photographing a certain user. In this manner, the processor 31 obtains a feature point coordinate series on the basis of the feature points calculated from the individual time series images (step S111). In this embodiment, the position coordinates of a total of four points, i.e., the central points of the pupils and nares, are used as the face feature points.

The processor 31 relates feature points extracted from two consecutive images. The processor 31 then calculates the difference (absolute value) between the positions of the related feature points of the two images (step S112). In this way, the processor 31 calculates the difference between the positions of the feature points in two consecutive images in the time series images.

On the basis of this difference between the positions of the feature points in consecutive images, the processor 31 detects the up-and-down motions or right-to-left motions of the feature points (step S113). If the up-and-down motions or right-to-left motions of the feature points can be detected (YES in step S114), the processor 31 determines that there is no "posing". By this determination, the processor 31 confirms that the person photographed by the camera is not impersonating another person, and completes the "posing" detecting process (step S115).

If the up-and-down motions or right-to-left motions of the feature points cannot be detected by the above detecting process (NO in step S114), the processor 31 determines that there is a possibility of "posing" (step S116). When thus determining that there is a possibility of "posing", the processor 31 performs processing for the person photographed by the camera, who may be impersonating another person.

As the processing when the possibility of "posing" is detected, the following processes can be performed.

(1) Record the possibility of "posing" into the attribute information.

(2) Inform an observer or management center of the possibility of "posing" (inform an observer of the possibility of "posing" by using a monitor apparatus or the like).

(3) Reject entrance or leaving of the person photographed by the camera if the face image recording apparatus is applied to a doorway monitoring system.

By these processes, countermeasures against "posing" can be accomplished.

In the above example of the "posing" detecting process, "posing" is found by detecting the motions of the pupils and nares. However, "posing" can also be found by the following methods.

(1) Detect blinking of the eyes (by, for example, detecting the pupils).

(2) Detect the motion of the mouth (by, for example, detecting the motion of either corner of the mouth).

(3) Detect the user's voice signal and detect a face image that corresponds to the user's voice (for example, the voice and the face image are recorded simultaneously).

As described above, the processing for "posing" is performed if it is determined that there is a possibility of "posing" by detecting the motion of a user from a plurality of photographed images, thereby checking whether there is a possibility of "posing". Accordingly, countermeasures can be taken for "posing" using a face photograph of another person, so "posing" can be prevented or reduced. This makes it possible to provide a face image recording apparatus having improved security without imposing any burden on the user.

In the first embodiment as described above, time series face images (a plurality of face images) of a substantially full face of a user are loaded from a camera installed at a predetermined distance. These face images are automatically processed and edited into an optimum image sequence by image processing, thereby collecting at least one image which has predetermined quality or higher and from which face feature points can be extracted. This image is recorded together with attribute information into a recorder (a log is recorded). That is, this first embodiment is characterized in that a face image having predetermined image quality or higher is loaded and recorded as log data. In addition, whether a face image has predetermined image quality or higher is determined by checking whether four feature points, i.e., pupils and nares, can be automatically detected.

Consequently, it is possible to provide a face image recording apparatus which can record a user's face image as log data and which improves the user's convenience while maintaining a certain security level.

Another characteristic feature of the first embodiment is to have a function (an "posing" detecting process) of checking whether a person poses as another person by using a face photograph or the like, before a face image is recorded in a recorder, in addition to the face image recording function as described above.

The method of checking the possibility of "posing" is to detect the motion of a face from time series face images photographed by a camera (motion image analysis). If the motion of the face can be detected, it is determined that there is no possibility of "posing"; if the motion of the face cannot be detected, it is determined that there is a possibility of "posing". In the latter case, predetermined processing is performed as a countermeasure against "posing". Consequently, it is possible to perform appropriate processing for "posing", prevent or reduce posing using a phase photograph or the like of another person, and improve the security level.

The second embodiment will be described below.

The second embodiment is a modification of the first embodiment. This second embodiment is implemented by a face image recording apparatus having an arrangement as shown in FIG. 6. In the second embodiment, feature amounts of the face of a registrant are registered beforehand in a face collating dictionary 38 in the configuration of the face image recording apparatus shown in FIG. 6. Also, in this second embodiment a processor 31 functions as a face collator 31c by using a control program stored in a program memory 33.

Figure 12:
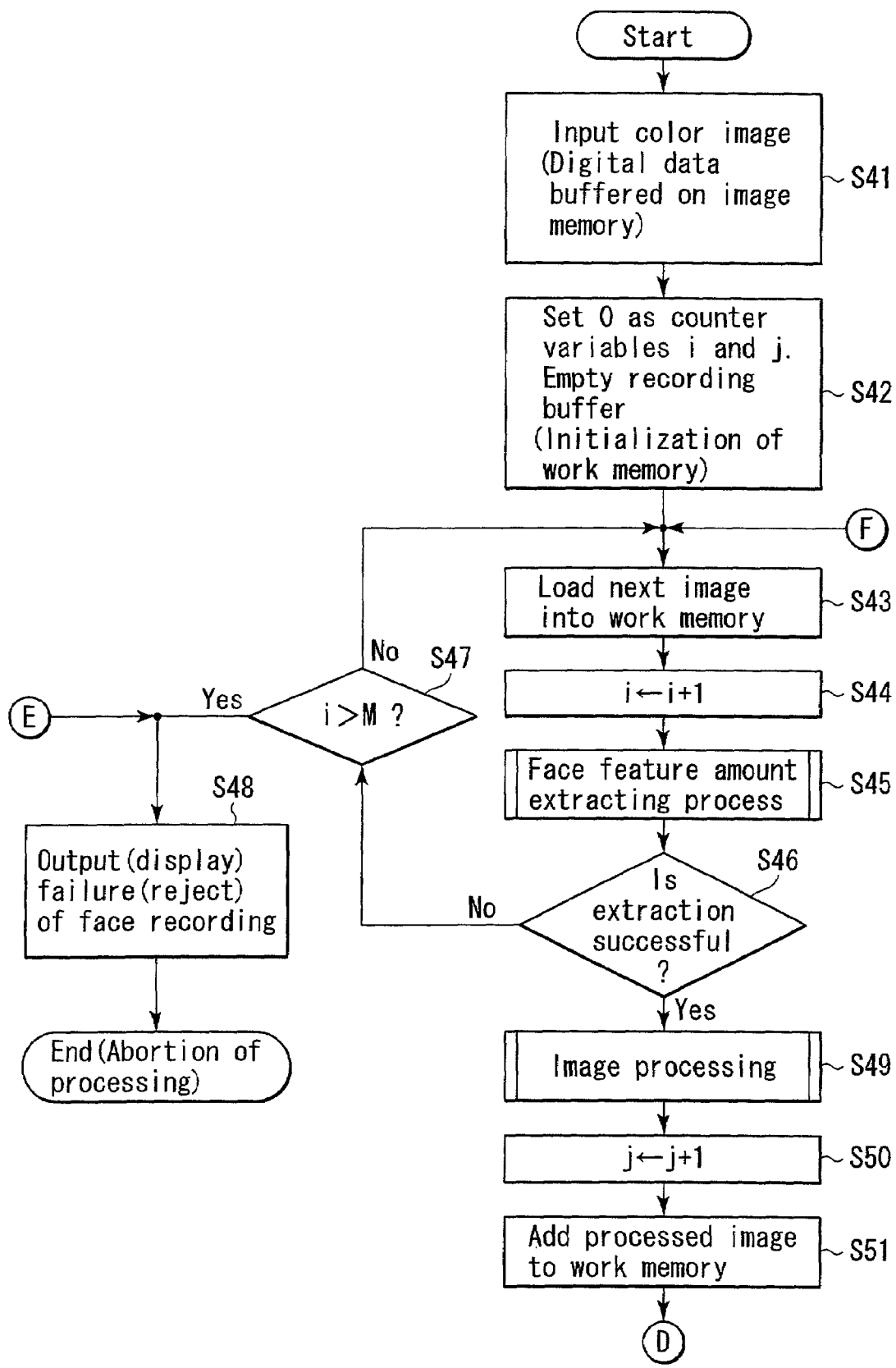
FIG. 12 is a flow chart for explaining the overall operation of the second embodiment.
Figure 13:
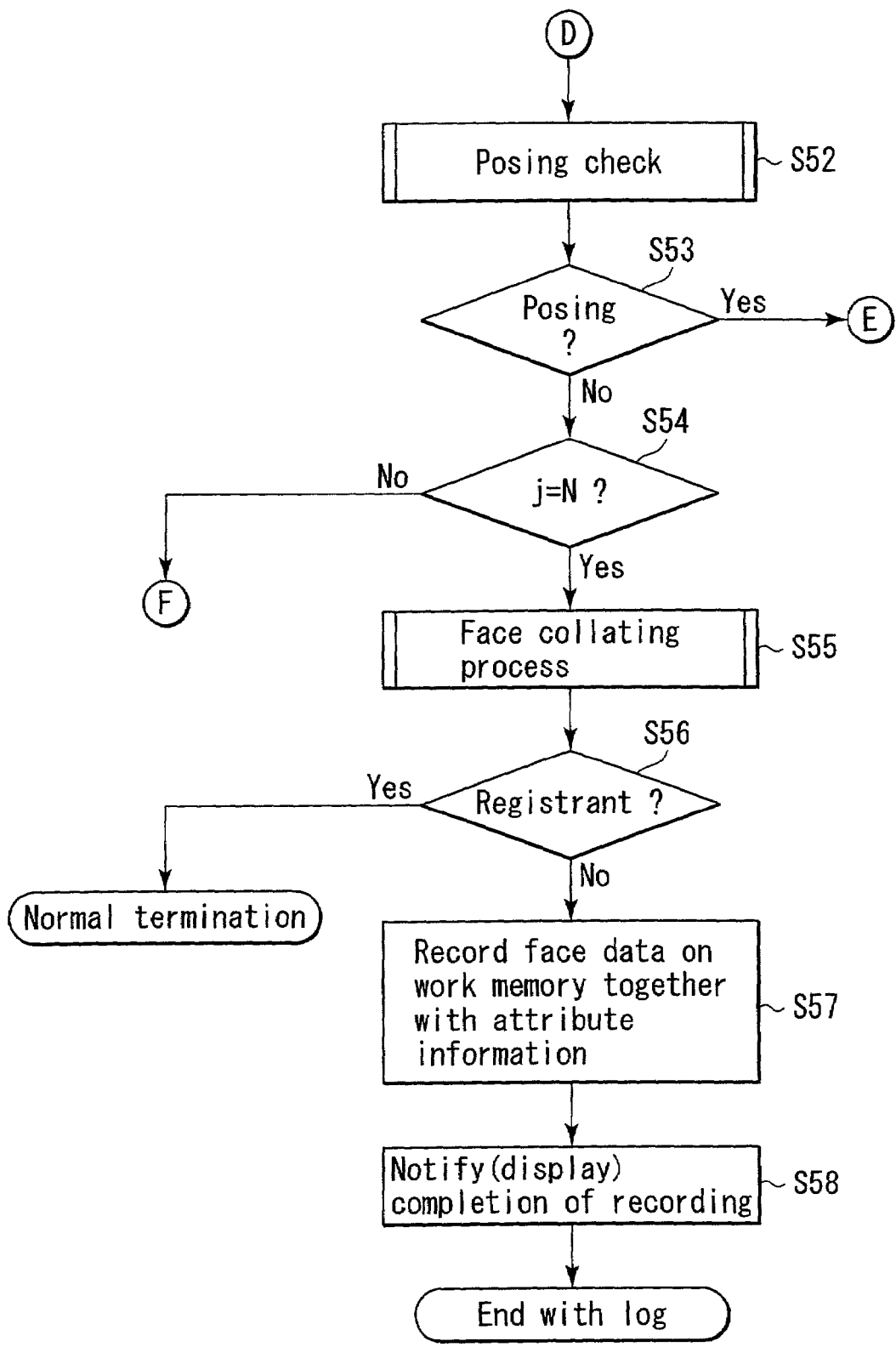
FIG. 13 is a flow chart for explaining the overall operation of the second embodiment.

FIGS. 12 and 13 are flow charts for explaining the second embodiment. This processing of the second embodiment shown in FIGS. 12 and 13 includes a face image collating process in addition to the processing of the first embodiment explained in FIGS. 7 and 8. That is, steps S41 to S54 of the processing shown in FIGS. 12 and 13 are the same as steps S1 to S14 of the processing shown in FIGS. 7 and 8. Therefore, an explanation of processes in these steps S41 to S54 will be omitted.

If determining in step S54 that a variable j is N, the processor 31 performs a face image collating process for an image from which face feature points can be extracted (step S55). Details of this face image collating process will be explained later. If determining, as a result of the face image collating process, that a person photographed by a camera 2 is a registrant (YES in step S56), the processor 31 normally terminates the processing. That is, if the collation of the person photographed by the camera 2 with the person registered in the face collating dictionary 38 is successful in the face collating process, the processor 31 does not record an image of the person photographed by the camera 2.

If the collation of the person photographed by the camera 2 with the registrant is unsuccessful (NO in step S56), the processor 31 records an image photographed by the camera 2 into a recorder 37 (step S57). Together with this image photographed by the camera 2, the processor 31 records in the recorder 37 attribute information such as the image photographing time and an ID number indicating the camera 2 or the face image recording apparatus which has photographed the image. When completely recording the image and the attribute information into the recorder 37, the processor 31 displays on a display 1 a message indicating that face image recording is completed, and terminates the processing (step S58).

The face image collating process will be explained below.

Figure 14:
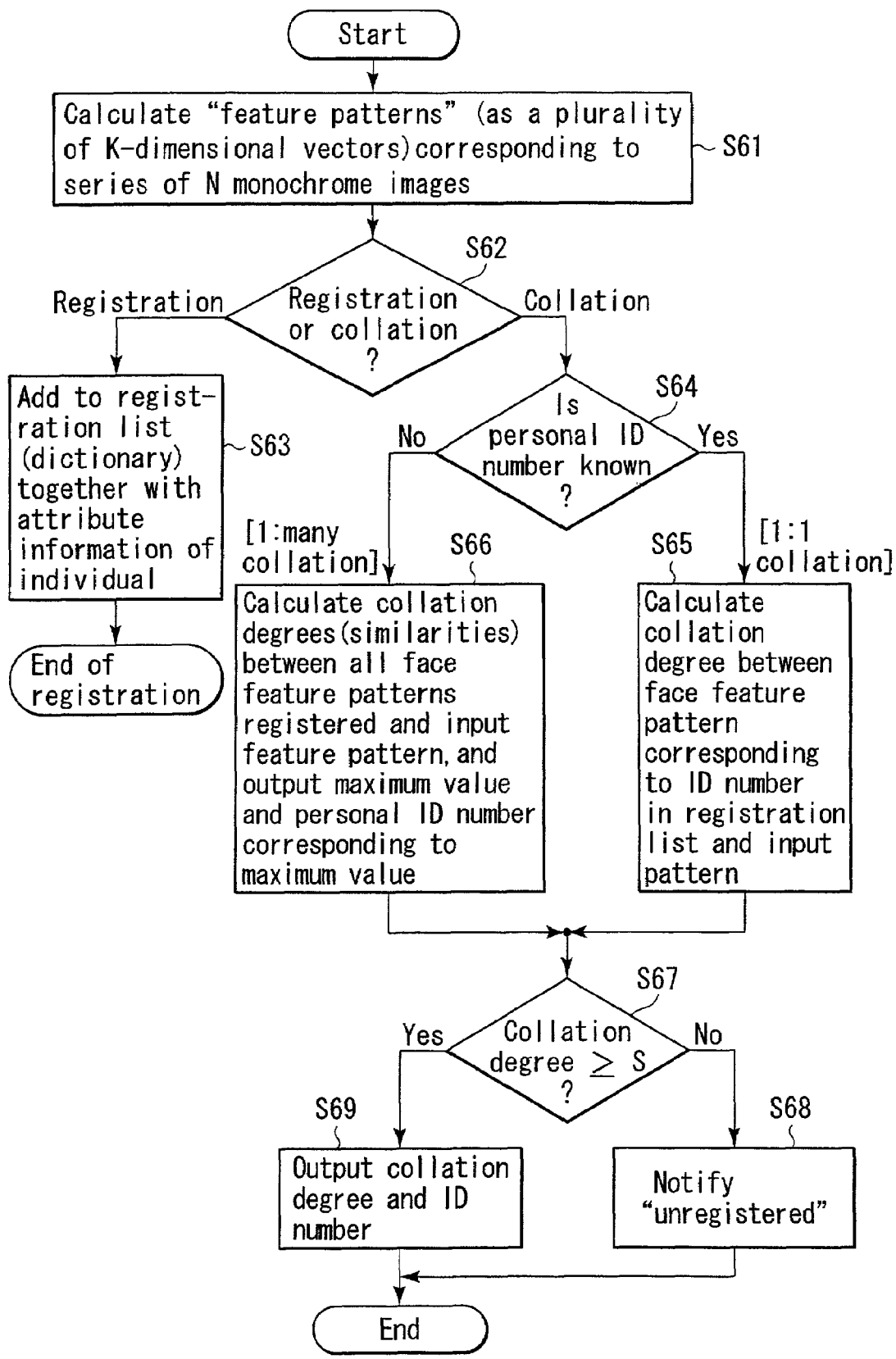
FIG. 14 is a flow chart for explaining a face image collating process.

FIG. 14 is a flow chart for explaining the face image collating process. First, the processor 31 converts N images as objects of the face image collating process into N monochrome images (a monochrome image series). Monochrome images obtained in step S22 described earlier can also be used in this conversion into monochrome images. The processor 31 extracts face feature amounts (feature points) from each of the N monochrome images (step S61). These face feature amounts are obtained as a plurality of K-dimensional vectors.

By using the face feature amounts thus extracted, the processor 31 selectively performs registration to the dictionary 38 or collation with face feature amounts registered in the dictionary 38. In this embodiment, assume that a manager has already designated which of registration to the dictionary 38 or collation is to be performed. Note that it is also possible to perform the registration process for a preset period since the apparatus has started operating, and perform the collation process after this set period. Alternatively, the registration process or the collation process can be performed in accordance with an instruction from a user.

First, the face image registration process will be explained (registration in step S62). To perform the face image registration process, the processor 31 registers the extracted feature amounts into the dictionary (registration list) 38 in relation to registration attribute information such as personal ID information (step S63). As the registration attribute information, information indicating an apparatus which has performed the registration process, information indicating the date and time of the registration process, or the like is used in addition to personal ID information for specifying (identifying) an individual. This personal ID information can be assigned by the processor 31 or designated by a manager or a user. By these processes, face feature patterns are completely registered in the dictionary 38.

The collation process will be explained next (collation in step S62). To perform the collation process, the processor 31 checks whether to perform a one-to-many collation process or a one-to-one collation process, in accordance with whether personal ID information is input by the user (step S64).

For example, when the collation process is to be performed in a one-to-one manner (1:1 collation), the user inputs his or her personal ID information from an input unit 5. In accordance with this personal ID information input by the user, the processor 31 searches for a feature pattern registered in the dictionary 38. That is, the processor 31 searches the dictionary 38 for a face feature amount corresponding to the personal ID information input by the user. By this search process, the processor 31 reads out a face feature amount corresponding to the personal ID information registered in the dictionary 38. After reading out the face feature amount corresponding to the personal ID information, the processor 31 calculates the degree of collation of the readout feature amount with the face feature amounts extracted in step S61 (step S65).

When the collation process is to be performed in a one-to-many manner (1:N collation), the processor 31 collates the extracted face feature amount with all the face feature amounts registered in the dictionary 38. That is, the processor 31 calculates the collation degrees (similarities) between the extracted face feature amount and all the face feature amounts registered in the dictionary 38. The processor 31 sets personal ID information corresponding to a face feature amount with which the collation degree is a maximum, together with this maximum value of the collation degree, as calculation results of the collation degree (step S66).

After thus calculating the collation degree by the one-to-one or one-to-many collation process, the processor 31 compares the calculated collation degree with a predetermined threshold value S (step S67). This predetermined threshold value S is a reference value for checking whether the face image is successfully collated with one registered in the dictionary 38. Note that this threshold value S is preset by an operator or the like. Note also that the threshold value of 1:1 collation and the threshold value of 1:N collation can be the same or different.

If the collation degree calculated in step S65 or S66 is less than the predetermined threshold value (NO in step S67), the processor 31 determines that the collation of the person photographed by the camera 2 with the person registered in the dictionary 38 is unsuccessful. On the basis of this determination, the processor 31 notifies, by using the display 1 or the like, that the photographed person is not a registrant (step S68).

If the calculated collation degree is equal to or larger than the predetermined threshold value (YES in step S67), the processor 31 determines that the collation of the person photographed by the camera with the person registered in the dictionary is successful. On the basis of this determination, the processor 31 notifies information indicating that the collation is successful, the collation degree, the personal ID information, or the like, by using, e.g., the display 1.

As described above, the collation process is performed by collating face feature amounts extracted from photographed images with face feature amounts registered in the dictionary. Therefore, face feature amounts of registrants are registered in the dictionary beforehand or registered in the dictionary by the registration process as described previously.

Also, face feature pattern data in a vector form is registered as face feature amounts into the dictionary in relation to attribute information such as the names of individuals and personal ID information. As the collation process and the registration process herein mentioned, the face feature amount extraction methods described in references 1 and 2 presented earlier can be applied.

If it is determined by the collation process that the person photographed by the camera may not be the registrant (collation with the registrant is unsuccessful), the image photographing time, the ID number indicating the camera 2 which has photographed the image or the apparatus which has loaded the image, the collation degree of the face image, and the like are recorded as attribute information. This allows an efficient face image recording process.

The following various modifications can be made from the second embodiment described above.

(1) The second embodiment is applied to an doorway monitoring system based on face collation results. This makes it possible to perform user doorway monitoring corresponding to the results of the face image collation process, and to record only face images of persons (suspicious persons) other than registrants. Consequently, a higher security level than in the conventional systems can be realized.

(2) If collation is unsuccessful, the face image recording apparatus notifies a management apparatus or the like. This notification to the management apparatus or the like is realized by communication with the management apparatus or the like by a radio communication board 39. This enhances observation of suspicious persons (unregistered persons) by a manager, and improves the security.

(3) Without performing processing corresponding to the collation result, the collation degree is simply recorded into the recorder 37 in addition to attribute information. This can simplify the processing, and improve the security because recorded face images can be analyzed later.

(4) Feature amounts of a specific person such as a suspicious person are recorded into the dictionary beforehand. If this specific person is detected, the face image recording apparatus notifies a management apparatus. That is, in the above embodiment, images of unregistered persons are recorded. In this modification, however, if collation with a specific person such as a suspicious person whose face feature amounts are registered in the dictionary is successful, the image is recorded, or the management apparatus is notified. Since face feature amounts of only a specific person need to be registered in the dictionary, it is possible to obtain effects of, e.g., saving the storage capacity of the dictionary and shortening the time of the collation process.

In the second embodiment as described above, the face collating process is added to the image recording process and, on the basis of the collation results, images photographed by the camera 2 are selectively recorded in the recorder. This improves the efficiency of the process of recording face images into the recorder. This is so because only a face image of a person who needs to be checked later by a manager can be recorded together with log information into the recorder. When a function of notifying a management apparatus if collation is unsuccessful in the face collating process is also used, the security level can be raised without increasing the burden on the user.

When the above second embodiment is applied to an doorway monitoring system based on the collation degree, the security level can be increased by recording face images, compared to a system in which entrance and leaving are simply managed in accordance with the collation degree.

It is also possible to set a first threshold value for determining permission/rejection of entrance/leaving with respect to the collation degree calculated in the collation process, and to set a second threshold value for determining whether to record an image such that this second threshold value is larger than the first threshold value. For example, if the collation degree is lower than the first threshold value, the doorway monitoring system rejects entrance or leaving and records the image. If the collation degree is equal to or larger than the first threshold value and lower than the second threshold value, the doorway monitoring system permits entrance or leaving and records the image. If the collation degree is larger than the second threshold value, the doorway monitoring system permits entrance or leaving without recording the image.

In this arrangement, even if the collation degree largely fluctuates, stable entrance/leaving can be performed, and images having low collation degrees can be recorded. Accordingly, even when the collation degree largely fluctuates owing to large environmental fluctuations, it is possible to realize flexible doorway monitoring while maintaining a certain security level, and increase the efficiency of the image recording process.

The third embodiment will be described below.

In this third embodiment, a search process, display process, dictionary registration process, and dictionary updating process are performed for face images recorded in a recorder of a face image recording apparatus by the operation of the first or second embodiment described above. In the following explanation, therefore, assume that face images are recorded together with attribute information into a recorder 37.

Figure 15:
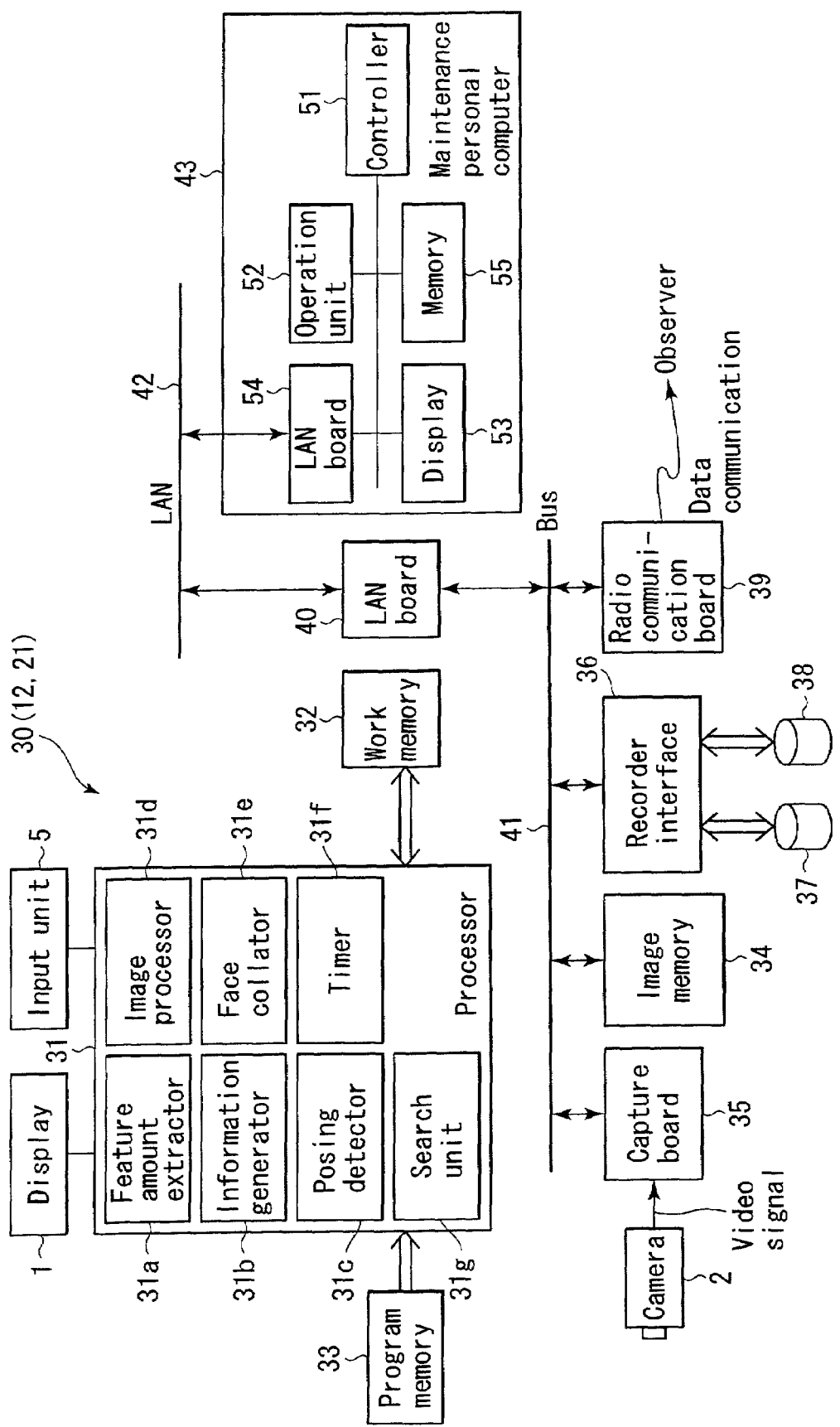
FIG. 15 is a block diagram showing an outline of the arrangement of a face image recording apparatus and maintenance personal computer according to the third embodiment.

FIG. 15 is a block diagram showing an outline of the arrangement of a face image recording apparatus according to the third embodiment. This face image recording apparatus of the third embodiment shown in FIG. 15 is obtained by connecting a maintenance personal computer 43 across a LAN 42 to the face image recording apparatus of the first embodiment shown in FIG. 6. The arrangement of the face image recording apparatus shown in FIG. 15 except for the maintenance personal computer is the same as the arrangement shown in FIG. 6, and a detailed explanation thereof will be omitted.

The maintenance personal computer 43 communicates with a LAN board 40 of the face image recording apparatus across the LAN 42. This maintenance personal computer 43 searches for a face image (log data) recorded in the recorder 37, and displays the face image as the search result.

The maintenance personal computer 43 need not always be connected to the face image recording apparatus, but can access the face image recording apparatus where necessary. It is also possible to install each component of the maintenance personal computer 43 (to be described later) into the face image recording apparatus main body, without using the maintenance personal computer 43, and perform a search process and display process (to be described later). Furthermore, the maintenance personal computer 43 need not be connected across the LAN 42 but can be directly connected to the face image recording apparatus.

As shown in FIG. 15, this maintenance personal computer 43 includes a controller 51, operation unit 52, display 53, LAN board 54, and memory 55. The controller 51 controls the whole maintenance personal computer 43. This controller 51 has functions of performing a search process and display process (to be described later). The operation unit 52 inputs instructions from a user. The display unit 53 displays, e.g., face images recorded in the recorder 37 of the face image recording apparatus. The LAN board 54 is an interface for connecting to the LAN 42. By using this LAN board 54, the maintenance personal computer 43 communicates with the face image recording apparatus across the LAN 42. The memory 55 is a RAM, ROM, or HDD, and stores image data and control data.

Face image search and display processes (person check) will be explained below.

Figure 16:
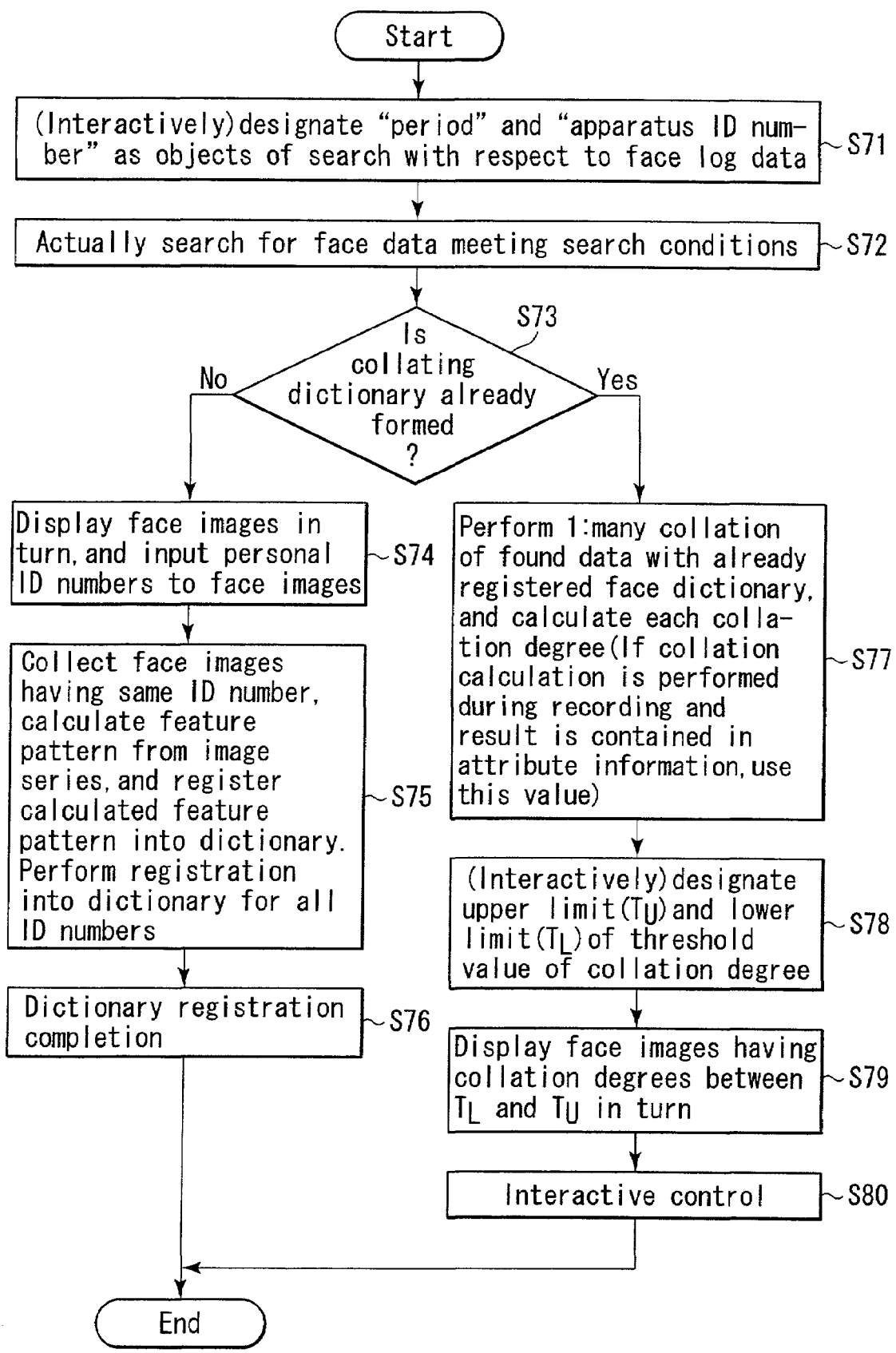
FIG. 16 is a flow chart for explaining a face image searching process.

FIG. 16 is a flow chart for explaining the face image search process.

First, an operator (manager) designates, on the operation unit 52 of the maintenance personal computer 43, search conditions (e.g., the period of recording, the ID number indicating the recording apparatus, and personal ID information) of a face image to be searched for (step S71). More specifically, the operator of the maintenance personal computer 43 inputs the search conditions in an interactive manner in accordance with messages displayed on the display 53.

When the search conditions are designated, the controller 51 transmits the designated search conditions across the LAN 42 to the face image recording apparatus. A processor 31 of the face image recording apparatus accesses the recorder 37 to search for a face image meeting the search conditions (step S72). If a face image meeting the search conditions is found, the processor 31 checks on the basis of the attribute information whether a collating dictionary 38 for the found face image is already formed (step S73). If the attribute information contains no information indicating the presence/absence of the collating dictionary 38, the processor 31 checks the presence/absence of the collating dictionary 38 on the basis of an instruction from the operator.

If the collating dictionary 38 is not formed (NO in step S73), the processor 31 reads out face images matching the search conditions in turn from the recorder 37 and supplies the readout images to the maintenance personal computer 43. The maintenance personal computer 43 displays on the display 53 the face images supplied from the face image recording apparatus one by one. That is, the display 53 displays a window for prompting the operator to input personal ID information corresponding to each face image. On the basis of this prompt, the operator inputs personal ID information corresponding to each face image from the operation unit 52. The input personal ID information is transmitted across the LAN 42 to the face image recording apparatus (step S74).

When receiving from the maintenance personal computer 43 the personal ID information input with respect to each face image, the processor 31 collects face images having the same personal ID information, and calculates face feature amounts from these images (the same image series). The calculated face feature amounts for the same image series are registered in the collating dictionary 38 as face feature amounts corresponding to the personal ID information (step S75). When the face feature amount calculation process and the process of registration to the collating dictionary 38 are performed for all image series found, registration of face feature amounts to the collating dictionary 38 is completed (step S76).

If the collating dictionary 38 is already formed (YES in step S73), the processor 31 calculates the degree of collation between each face image found and face feature amounts registered in the collating dictionary 38 (step S77). However, if a face image collating process is performed when a face image is recorded and attribute information contains the calculation result of the collation degree in this collation process, the processor 31 reads out the collation degree from the attribute information recorded in the recorder 37.

Additionally, the processor 31 requests the maintenance personal computer 43 to designate the upper limit (upper-limit value) and the lower limit (lower-limit value) of a threshold value of the collation degree. The controller 51 of the maintenance personal computer 43 displays on the display 53 a message for prompting the operator to input the upper and lower limits of the threshold value of the collation degree. In accordance with this message, the operator interactively designates the upper and lower limits of the threshold value of the collation degree (step S78).

These upper and lower limits of the threshold value designate the range of the collation degree as an object of check by the operator. That is, a face image having a collation degree between the upper- and lower-limit values is an object to be checked. This is so because if the collation degree of a face image is larger than the upper-limit value, this face image is regarded as the same as the above face image and hence is not checked; if the collation degree of a face image is smaller than the lower-limit value, this face image is regarded as different from the above face image and hence is excluded from objects of check.

Accordingly, the operator checks face images having collation degrees between the upper and lower limits of the threshold value designated by the operator. If the upper-limit value is +infinite, all face images having collation degrees equal to or larger than the lower-limit value are checked. If the lower-limit value is −infinite (0), face images having collation degrees equal to or smaller than the upper-limit value are checked.

When the operator thus designates the upper and lower limits of the threshold value of the collation degree, the controller 51 of the maintenance personal computer 43 transmits the designated upper and lower limits of the threshold value to the face image recording apparatus. Upon receiving the upper and lower limits of the threshold value of the collation degree, the processor 31 of the face image recording apparatus checks whether the collation degree calculated in step S77 is between the designated upper and lower limits of the threshold value.

On the basis of this check, the processor 31 transmits face images having collation degrees between the upper- and lower-limit values in turn to the maintenance personal computer 43. The maintenance personal computer 43 displays the face images transmitted from the face image recording apparatus one by one on the display 53 (step S79).

Consequently, face images to be checked by the operator are displayed on the display 53. These images displayed on the display 53 are subjected to operations by the operator and various processes interactively executed by messages displayed on the display 53 in accordance with the operator's operations (step S80).

Figure 17:
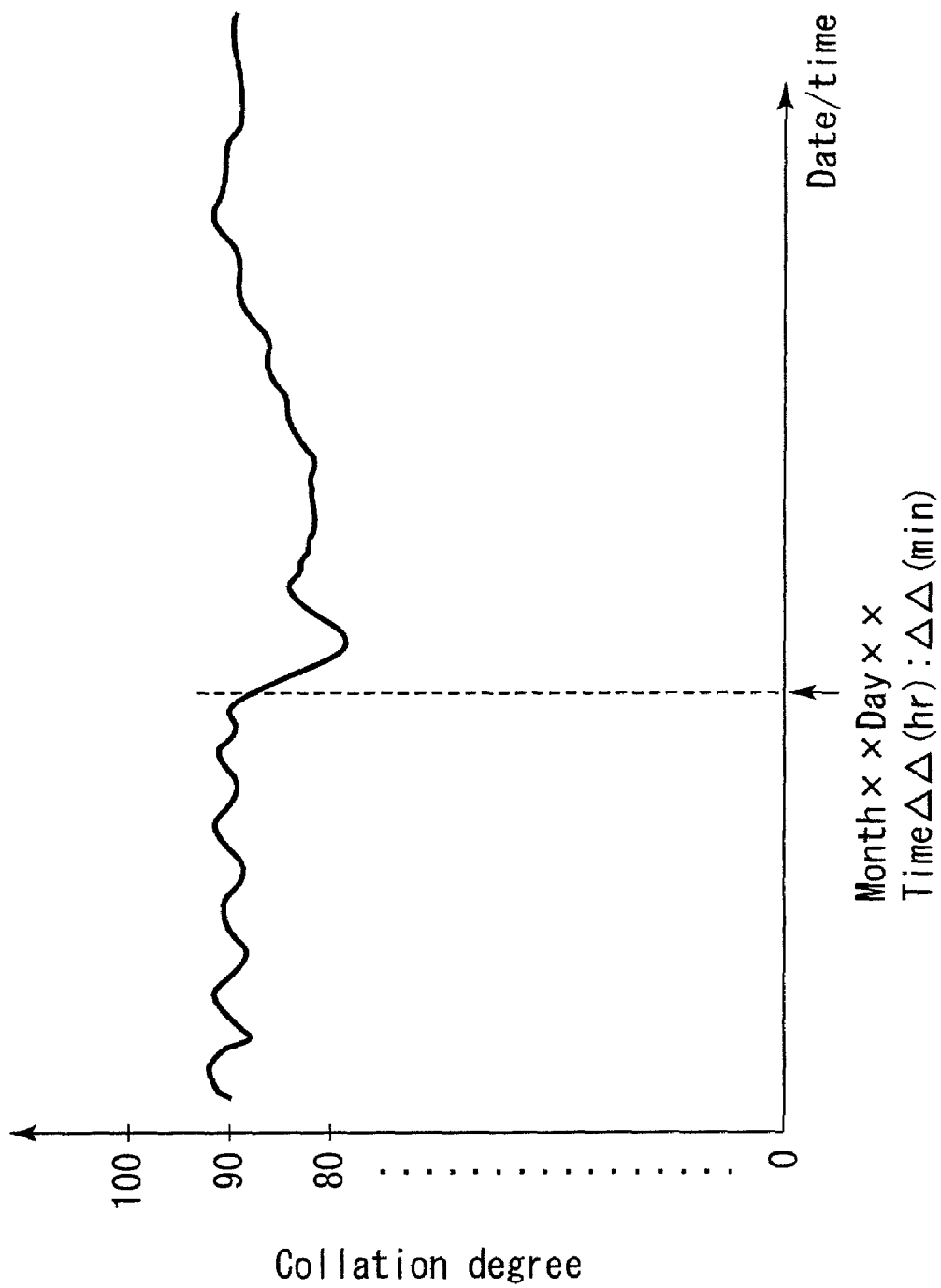
FIG. 17 is a graph showing a change in a collation degree over time of a particular individual.

FIG. 17 shows an example of the process in step S80, in which the degree of collation as the result of the collation process performed for specific personal ID information is displayed in relation to the passage of time. That is, when the operator designates personal ID information as the search condition in step S71, a face image matching this search condition is collated with the collating dictionary 38 corresponding to the designated personal ID information if this collating dictionary 38 is already formed.

In this process, the maintenance personal computer 43 designates the upper and lower limits of the threshold value of the collation degree as an object of search. Accordingly, the processor 31 transmits to the maintenance personal computer 43 face images having collation degrees between the upper and lower limits, obtained as the results of the collation process, together with attribute information. Consequently, the maintenance personal computer 43 obtains all face images having collation degrees within the designated range and attribute information containing the recording times of these face images. On the basis of these pieces of information, the maintenance personal computer 43 can display a graph showing the collation degree as a function of the recording time with respect to a specific individual.

For example, assume that the collation degree takes an integral value from 0 to 100, the upper limit of the threshold value is 100 (+infinite), and its lower limit is 80. In this case, collation degrees of face images having collation degrees of 80 or more of all face images corresponding to the designated personal ID information are obtained as the results of the collation process. If the time (date/time) at which attribute information corresponding to each face image is recorded, the display 53 of the maintenance personal computer 43 can display (form) a graph, as shown in FIG. 17, representing the transition of the collation degree with time.

This graph allows the operator to understand with a single glance when the collation degree fell and when the collation degree recovered. For example, when the user has changed his or her hair style or when the user has bad physical conditions, the collation degree presumably decreases. Therefore, the state of the user can be determined from the graph as shown in FIG. 17. That is, since a change in the collation degree with respect to a specific user can be confirmed, it is possible to determine or predict changes in the user such as the transition of the health condition or changes in habits of life.

The process of updating the dictionary 38 by using a face image meeting the designated search condition will be explained below.

Figure 18:
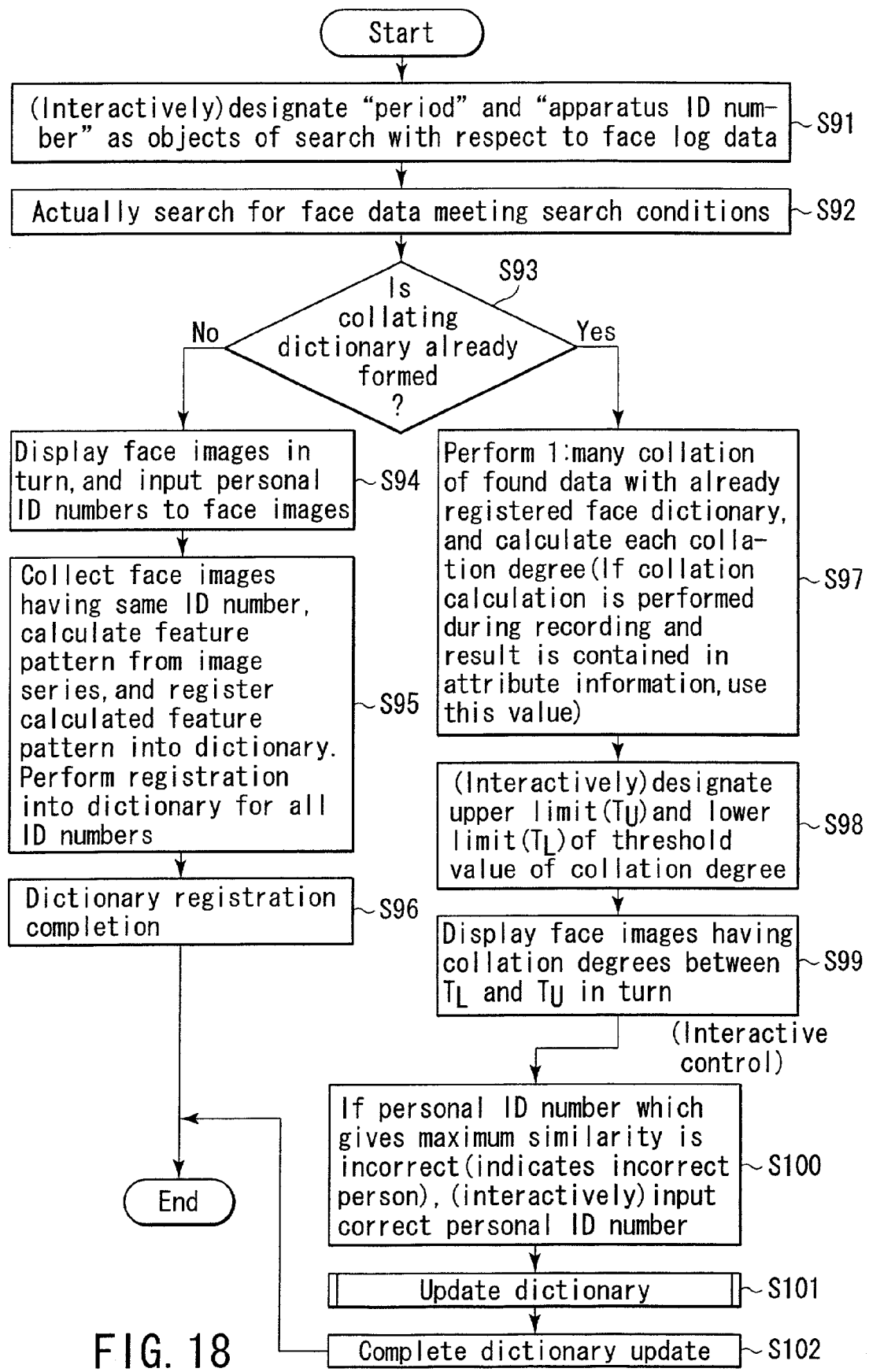
FIG. 18 is a flow chart for explaining the operation of a collating dictionary updating process.

FIG. 18 is a flow chart for explaining the operation of this process of updating the dictionary 38 by using a face image matching the designated search condition. This flow chart shown in FIG. 18 indicates an operation of updating the dictionary 38 on the basis of a face image found by the operation of the flow chart shown in FIG. 16. That is, operations in steps S91 to S99 shown in FIG. 18 are the same as the operations in steps S71 to S79 shown in FIG. 16. Also, steps S100 to S102 shown in FIG. 18 perform a process of updating the dictionary 38 as an example of the process in step S80 shown in FIG. 16.

Accordingly, a description of steps S91 to S99 will be omitted, and operations in steps S100 to S102 will be explained below.

In step S99, as in step S79 described earlier, the display 53 of the maintenance personal computer 43 displays, one by one, face images having collation degrees within the range (between the upper and lower limits of the threshold value) designated by the operator. Additionally, on the basis of the operation by the operator, the controller 51 displays on the display 53 personal ID information by which the maximum value (maximum similarity) of the collation degree is given.

On the basis of this display, the operator determines whether the personal ID information of a face image which gives the maximum similarity is correct. If determining that this personal ID information is incorrect, the operator interactively inputs correct personal ID information in accordance with messages displayed on the display 53 under the control of the controller 51 (step S100). If the operator determines that the personal ID information is correct, the controller 51 proceeds, on the basis of the operation by the operator, to the process of updating face feature amounts corresponding to the personal ID information displayed on the display 53 (i.e., to the process of updating the dictionary 38). By these operations, the operator determines correct personal ID information of a face image by which the maximum similarity is given.

When the correct personal ID information is determined, the controller 51 transmits this correct personal ID information corresponding to the face image of interest to the face image recording apparatus. When the correct personal ID information is notified from the maintenance personal computer 43, the processor 31 calculates face feature amounts to be registered into the collating dictionary 38, from the face image which gives the maximum collation degree (maximum similarity). After calculating the face feature amounts, the processor 31 records the calculated face feature amounts into the dictionary 38 in relation to the personal ID information notified from the maintenance personal computer 43 (step S101).

If face feature amounts corresponding to the personal ID information already exist in the dictionary 38, the processor 31 updates the dictionary 38 by rewriting the face feature amounts corresponding to the personal ID information. If no face feature amounts corresponding to the personal ID information exist in the dictionary 38, the processor 31 updates (performs new registration to) the dictionary 38 by adding to the dictionary 38 the face feature amounts corresponding to the personal ID information.

When completing the process of updating the dictionary 38 (step S102), the processor 31 notifies the maintenance personal computer 43 of the completion of update of the dictionary 38. The controller 51 of the maintenance personal computer 43 which has received this notification displays on the display 53 a message indicating the completion of update of the dictionary 38, and terminates the process. In this manner, the dictionary 38 can be updated by using face images stored (recorded) in the recorder 37 only by operations by the operator of the maintenance personal computer 43.

In this third embodiment as described above, face images recorded in the recorder can be searched for on the basis of search conditions designated by an operator. Accordingly, only face images matching desired search conditions can be read out from the recorder, and various processes can be performed using the readout face images. For example, it is possible to designate personal ID information, search for face images corresponding to this personal ID information, and display these face images in turn on the basis of attribute information such as the recording time of each face image.

The following operations can be performed on face images found on the basis of search conditions designated by an operator.

(1) If a face collating dictionary is already prepared, only face images (found face images) having low maximum collation degrees are checked while one-to-many collation is performed. This makes it possible to efficiently check persons having low collation degrees and hence considered to be suspicious. If no face collating dictionary is prepared in advance, face images are searched for and displayed in turn, on the basis of attribute information such as the recording time, to allow the user to interactively designate personal ID information, thereby performing registration or correction to the face collating dictionary. This obviates the need to additionally photograph face images for registration or update to the face collating dictionary, and improves the convenience.

(2) If attribute information of a face image recorded in the recorder contains personal ID information, this personal ID information is designated as search information, and face images having the same personal ID information are searched for, thereby newly forming or updating a personal collating dictionary. This makes it unnecessary to newly register or update a face pattern registered in a collating dictionary.

(3) If attribute information of a face image recorded in the recorder contains personal ID information, this personal ID information is designated as search information, and face images having the same personal ID information are searched for. On the basis of attribute information of the face images found, the face image recording status of each individual is displayed by a graph or the like. This allows an operator to readily manage the face image recording status (use status) of each individual. Additionally, when this third embodiment is applied to a doorway monitoring system, the entrance/leaving action of each individual can be traced in the form of a graph or the like.

(4) If attribute information of a face image recorded in the recorder contains personal ID information, this personal ID information is designated as search information, and face images having the same personal ID information are searched for. On the basis of attribute information of the face images found, a graph indicating a change in the collation degree of each individual is displayed. Accordingly, a change in the collation degree over time of each individual can be traced. In addition, a change in a user such as the transition of the user's health condition can be estimated from fluctuation information of face feature amounts.

(5) A face image of a suspicious person or the like is newly presented, and face images having high collation degrees with respect to the person are searched for from face images recorded in the recorder and displayed together with attribute information. Accordingly, only a specific person can be searched for by using face images. This facilitates narrowing down suspicious persons and analyzing behaviors of suspicious persons.

As described above, the third embodiment is characterized in that face images are recorded as log data into the recorder as a normal operation as in the first and second embodiments, and only face images matching search conditions which can be designated by an operator are found from the recorder and displayed.

That is, the third embodiment is characterized in that if face feature amounts for collation are registered in a dictionary, only "suspicious persons" (persons having low maximum collation degrees) can be efficiently checked while one-to-many collation is performed. This feature allows a manager to efficiently check only "suspicious persons" without impairing the user's convenience, thereby improving the security level.

Another characteristic feature of the third embodiment is that face images are recorded as log data into the recorder as a normal operation as in the first and second embodiments, and the face images thus recorded in the recorder are used to newly register face feature amounts into a collating dictionary, or to update face feature amounts registered in a collating dictionary for controlling changes in user's face feature amounts with time.

That is, if no face feature amounts are registered in a dictionary, face images are searched for and displayed in turn on the basis of attribute information such as the time at which each face image is recorded. A manager interactively designates personal ID information to newly register face feature amounts for collation. Accordingly, face feature amounts for collation can be efficiently newly registered without any burden on users.

If face feature amounts are already registered in a dictionary, face images having the same personal ID information are collected by search, and face feature amounts for face collation of each individual are calculated, thereby updating face feature patterns registered in the dictionary. This makes it possible to correct the dictionary by the collation results without any burden on users, and to efficiently update face feature amounts for collation.

The fourth embodiment will be described below.

In the fourth embodiment, the processing explained in the first, second, or third embodiment is combined with a person identification method other than face collation. That is, in this fourth embodiment, the face image recording apparatus explained in the first, second, or third embodiment is combined (used together) with a person identification method using an ID card or a person identification method using biometrics other than face collation.

Note that a method which identifies a person by combining face image recording and another person identification method as in this fourth embodiment is called a standalone combination type. Note also that a face image can be recorded in a recorder only when a person identification method other than face image identification determines that a person of interest is a suspicious person, or all face images can be recorded for confirmation into a recorder regardless of identification results from a person identification method other than face image identification.

Figure 19:
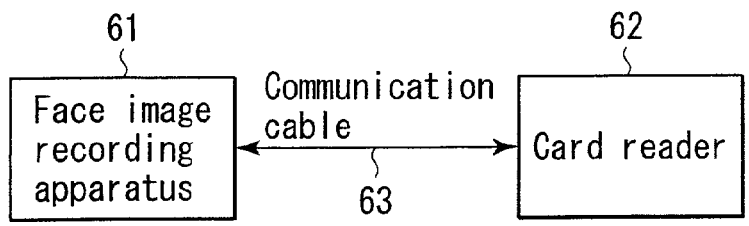
FIG. 19 is a block diagram showing an arrangement when a card reader is connected to a face image recording apparatus according to the fourth embodiment.

FIG. 19 is a view showing an arrangement in which a card reader 62 is connected to a face image recording apparatus 61. The configuration of this face image recording apparatus 61 is the same as that shown in FIG. 6 or 15, so a detailed description thereof will be omitted.

This arrangement shown in FIG. 19 is applied to the face image recording apparatus 61 with a user interface unit 10 having an input unit 5 such as a ten-key pad as shown in FIG. 2. From this input unit 5, a password for use in ID card reading is input. In the face image recording apparatus 61 with this configuration, an image of the face of a user is photographed by a camera 2, and the user inputs a password by the input unit 5. If an ID card is a contact type recording medium, the user inserts the ID card into the card reader 62. If this ID card is a wireless card and the card reader 62 is a wireless card reader, the user need only input the password without inserting the ID cart into the card reader 62.

A processor 31 first reads the password recorded on the ID card of the user by the card reader 62. When the card reader 62 reads the password recorded on the ID card, the processor 31 checks whether the password input by the user matches the password read out by the card reader, thereby checking whether the user is the person himself or herself. If the two passwords are different and so the user cannot be identified as the person himself or herself, the processor 31 determines that the user is a suspicious person. In this case, he processor 31 performs predetermined operation as when "posing" described previously is detected.

If the two passwords match and the user is found to be the person himself or herself, the processor 31 allows the card reader 62 to read out personal ID information from the ID card. In the subsequent processing, operations similar to those indicated by the flow charts shown in FIGS. 7 and 8 or 12 and 13 are performed. If face collation is to be performed, a face feature pattern corresponding to the personal ID information is read out from a dictionary 38 and collated in one-to-one correspondence with a face feature pattern obtained from the image photographed by the camera 2. However, to check a specific person such as a suspicious person, one-to-many face collation is performed.

Figure 20:
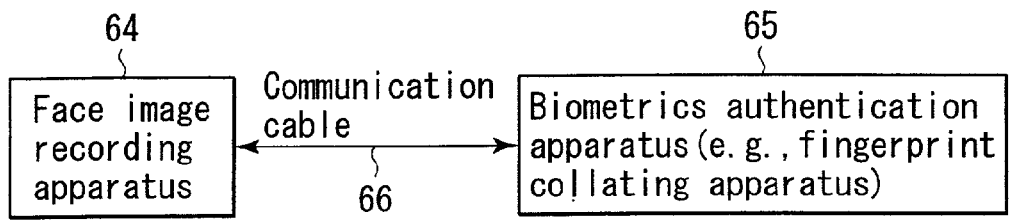
FIG. 20 is a block diagram showing an arrangement when a biometrics authentication apparatus is connected to a face image recording apparatus.

FIG. 20 is a view showing an arrangement when a biometrics authentication apparatus 65 using biometrics other than face collation is connected to a face image recording apparatus 64. As person identification using biometrics (biomedical information), a collation process using a fingerprint, a voiceprint, a signature, the retina or iris of an eye, or a venous pattern at the back of a hand is performed. The arrangement of the face image recording apparatus 64 shown in FIG. 20 is the same as that shown in FIG. 6 or 15, so a detailed explanation thereof will be omitted.

The configuration shown in FIG. 20 is applied to a face image recording apparatus having a user interface unit 10 as shown in FIG. 1 or 2. In the face image recording apparatus 64 with this configuration, a camera 2 photographs an image of the face of a user, and the biometrics authentication apparatus 65 reads biomedical information of the user. The biometrics authentication apparatus 65 specifies an individual by collating the read user's biomedical information with biomedical information registered beforehand, and reads out personal ID information. After the personal ID information is read out by this operation, operations analogous to those indicated by the flow charts shown in FIGS. 7 and 8 or 12 and 13 are performed.

As described above, this fourth embodiment is characterized in that the face image recording apparatus of the first, second, or third embodiment is combined with another person identification method. This can increase the security level.

Also, in the fourth embodiment, it is possible to combine multiple person authentication means (two or more person authentication means and face image recording) such as an ID card and a biometrics authentication apparatus. The security level can be increased where necessary by thus combining multiple person authentication means.

The fifth embodiment will be described below.

In this fifth embodiment, a face image recording system in which a face image recording apparatus is connected to a network will be explained.

Figure 21:
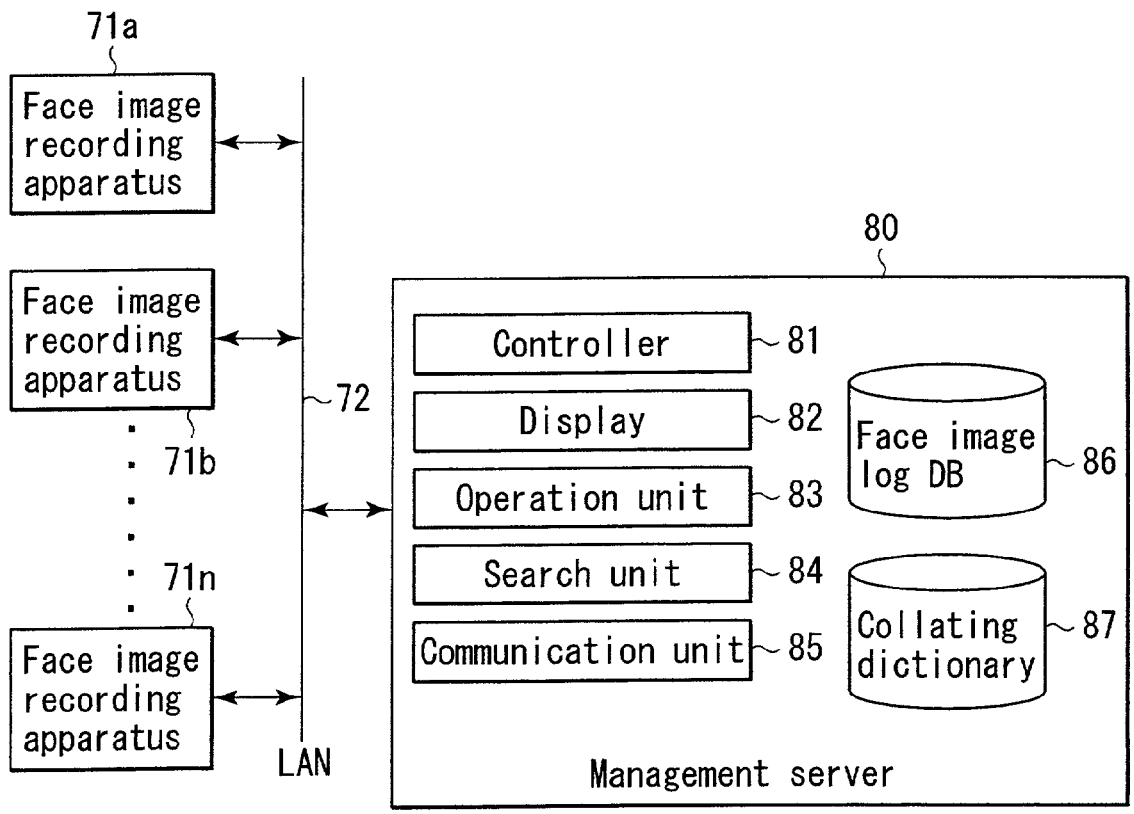
FIG. 21 is a block diagram showing the configuration of a face image recording system according to the fifth embodiment.

FIG. 21 is a view showing the configuration of the face image recording system according to the fifth embodiment. In this face image recording system as shown in FIG. 21, a plurality of face image recording apparatuses (71a, 71b, . . . , 71n) and a management server 80 are connected across a network 72.

Each of the face image recording apparatuses 71a, 71b, . . . , 71n has functions similar to the face image recording apparatuses of the first to fourth embodiments. Also, the arrangement of each of these face image recording apparatuses 71a, 71b, . . . , 71n is the same as shown in FIG. 6 or 15, so a detailed description thereof will be omitted. The network 72 is a LAN or the Internet.

The management server 80 is a personal computer or the like. This management server 80 is installed in, e.g., a monitoring center for monitoring images photographed by the face image recording apparatuses (71a, 71b, . . . , 71n). For example, the management server 80 can record, search for, and display face images. The management server 80 comprises, e.g., a controller 81, display 82, operation unit 83, search unit 84, communication unit 85, face image log database (DB) 86, and collating dictionary 87.

The controller 81 controls the whole management server 80. The display 82 is a display device. This display 82 displays images photographed by cameras 2 of the face image recording apparatuses (71a, 71b, . . . , 71n). The operation unit 83 is an input device such as a keyboard or mouse. From this operation unit 83, an observer operating the management server 80 inputs instructions such as operation modes of the face image recording apparatuses (71a, 71b, . . . , 71n). The search unit 84 searches images recorded in the face image log DB 86 for images matching designated search conditions. The communication unit 85 is a network interface for connecting to the network 72. The face image log DB 86 has the same configuration as a recorder 37 described earlier. This face image log DB 86 records together with attribute information images transmitted across the network from the face image recording apparatuses (71a, 71b, . . . , 71n). The collating dictionary 87 has the same configuration as a dictionary 38 described previously. This collating dictionary 87 records feature amounts of the faces of people.

In the face image recording system configured as above, the management server 80 installed in a monitoring center or the like collectively manages the face image recording apparatuses installed in a plurality of locations. That is, the management server 80 installed in a remote monitoring center can collectively monitor the face image recording apparatuses installed in a plurality of locations.

The face image recording apparatuses (71a, 71b, . . . , 71n) of this face image recording system transmit face images recorded by the cameras 2 to the management server 80 across the network 72, instead of recording these face images into internal recorders of the face image recording apparatuses as in the first and second embodiments. The management server 80 collectively monitors these face images from the face image recording apparatuses (71a, 71b, . . . , 71n) by displaying the face images on the display 82. Accordingly, an observer in a remote place can monitor images photographed by a plurality of face image recording apparatuses by the management server 80. Note that the face image recording apparatuses (71a, 71b, . . . , 71n) can also record face images into recorders 37, in addition to transmitting these face images to the management server 80. In this case, the log of a face image can also be checked in each of these face image recording apparatuses (71a, 71b, . . . , 71n).

In addition, the management server 80 records, where necessary, face images transmitted from the face image recording apparatuses (71a, 71b, . . . , 71n) into the face image log DB 86. For example, if any of the face image recording apparatuses (71a, 71b, . . . , 71n) transmits a face image and notifies that the person of interest is a suspicious person, the management server 80 records this face image into the face image log DB 86. Alternatively, if any of the face image recording apparatuses (71a, 71b, . . . , 71n) transmits a face image and notifies that the person of interest is a suspicious person, the management server 80 can record the face image into the face image log DB 86 in accordance with an operation by the observer.

Furthermore, if the face image recording apparatuses (71a, 71b, . . . , 71n) have various operation modes, these operation modes may be switched by the management server 80. Assume, for example, that each of the face image recording apparatuses (71a, 71b, . . . , 71n) has a system operation mode and a terminal operation mode. In this case, these operation modes are switched by an instruction, based on an operation by the observer, from the management server 80.

In the system operation mode, the management server 80 collectively manages each face image recording apparatus in the face image recording system. This system operation mode is set when, e.g., an observer is present in the monitoring center in which the management server 80 is installed. That is, the system operation mode is set when the management server 80 collectively manages face images photographed by each face image recording apparatus (71a, 71b, . . . , 71n). The system operation mode is realized when the management server 80 instructs the face image recording apparatuses (71a, 71b, . . . , 71n) to set the system operation mode.

In the terminal operation mode, the face image recording apparatuses (71a, 71b, . . . , 71n) operate independently of each other and individually record face images. This terminal operation mode is set when, e.g., no observer is present in the monitoring center in which the management server 80 is installed. That is, the terminal operation mode is set when the management server 80 does not collectively manage face images photographed by the face image recording apparatuses (71a, 71b, . . . , 71n), but these face image recording apparatuses (71a, 71b, . . . , 71n) record the images. This terminal operation mode is executed when the management server 80 instructs the face image recording apparatuses (71a, 71b, . . . , 71n) to set the terminal operation mode.

The management server 80 may also separately instruct the face image recording apparatuses (71a, 71b, . . . , 71n) to set the terminal operation mode or the system operation mode. For example, if an observer intends to solely monitor only a particular face image recording apparatus, this observer operates the management server 80 to instruct this face image recording apparatus to be solely monitored to set the system operation mode, and to instruct the other face image recording apparatuses to set the terminal operation mode. This allows the observer to monitor only an image photographed by the face image recording apparatus to be solely monitored.

As in the second embodiment, each of the face image recording apparatuses (71a, 71b, . . . , 71n) performs a 1:1 collation process or 1:N collation process for an image photographed by the camera 2. If collation is unsuccessful or posing is detected in this collation process by any of these face image recording apparatuses (71a, 71b, . . . , 71n), this face image recording apparatus transmits the image photographed by the camera 2 to the management server 80. Accordingly, the management server 80 can record, in the face image log DB 86, the image by which face collation is unsuccessful or posing is detected in the corresponding one of the face image recording apparatuses (71a, 71b, . . . , 71n).

Note that each face image recording apparatus may perform a collation process by using an internal collating dictionary 38 of the face image recording apparatus as shown in FIG. 6 or 15, or by using the collating dictionary 87 connected to the management server 80.

The above face image recording system can be applied to a doorway monitoring system. For example, when an entrance/leaving controller is connected to each face image recording apparatus, each face image recording apparatus can control the entrance or leaving of a person by using this entrance/leaving controller. When each face image recording apparatus is configured as above, the management server 80 instructs each face image recording apparatus to permit entrance or leaving.

That is, the display 82 of the management server 80 displays an image photographed by the camera 2 of each face image recording apparatus in the system operation mode. By monitoring this image displayed on the display 82, the observer of the management server 80 determines permission or rejection of the entrance or leaving of the person of interest. On the basis of this determination, the observer designates permission or rejection of the entrance or leaving of the person of interest from the operation unit 83. In accordance with this designation from the observer, the management server 80 instructs the corresponding face image recording apparatus to permit or reject the entrance or leaving of the person of interest. In accordance with this instruction from the management server 80, the corresponding face image recording apparatus controls the entrance or leaving by the entrance/leaving controller. This allows the face image recording system of the fifth embodiment to be applied to an doorway monitoring system.

In the fifth embodiment as described above, a plurality of face image recording apparatuses installed in a plurality of locations and a management server are connected by a network, and the operations of these face image recording apparatuses are collectively managed (monitored) by the management server. That is, an observer can perform centralized monitoring by monitoring, on the management server, images photographed by the plurality of face image recording apparatuses, and thereby can efficiently manage these face image recording apparatuses.

Also, the management server has a means for switching an operation mode in which face images as log data are distributed and stored (recorded) in the individual face image recording apparatuses, and an operation mode in which face images from the face image recording apparatuses are collected to the management server and managed and stored (recorded) in one place. Accordingly, each face image recording apparatus can be managed in accordance with the operating status of the system, and this improves the manager's convenience.

The sixth embodiment will be described below.

This sixth embodiment is an information management system constructed by an information terminal (e.g., a personal computer or portable telephone) and a management server connected to a network.

Figure 22:
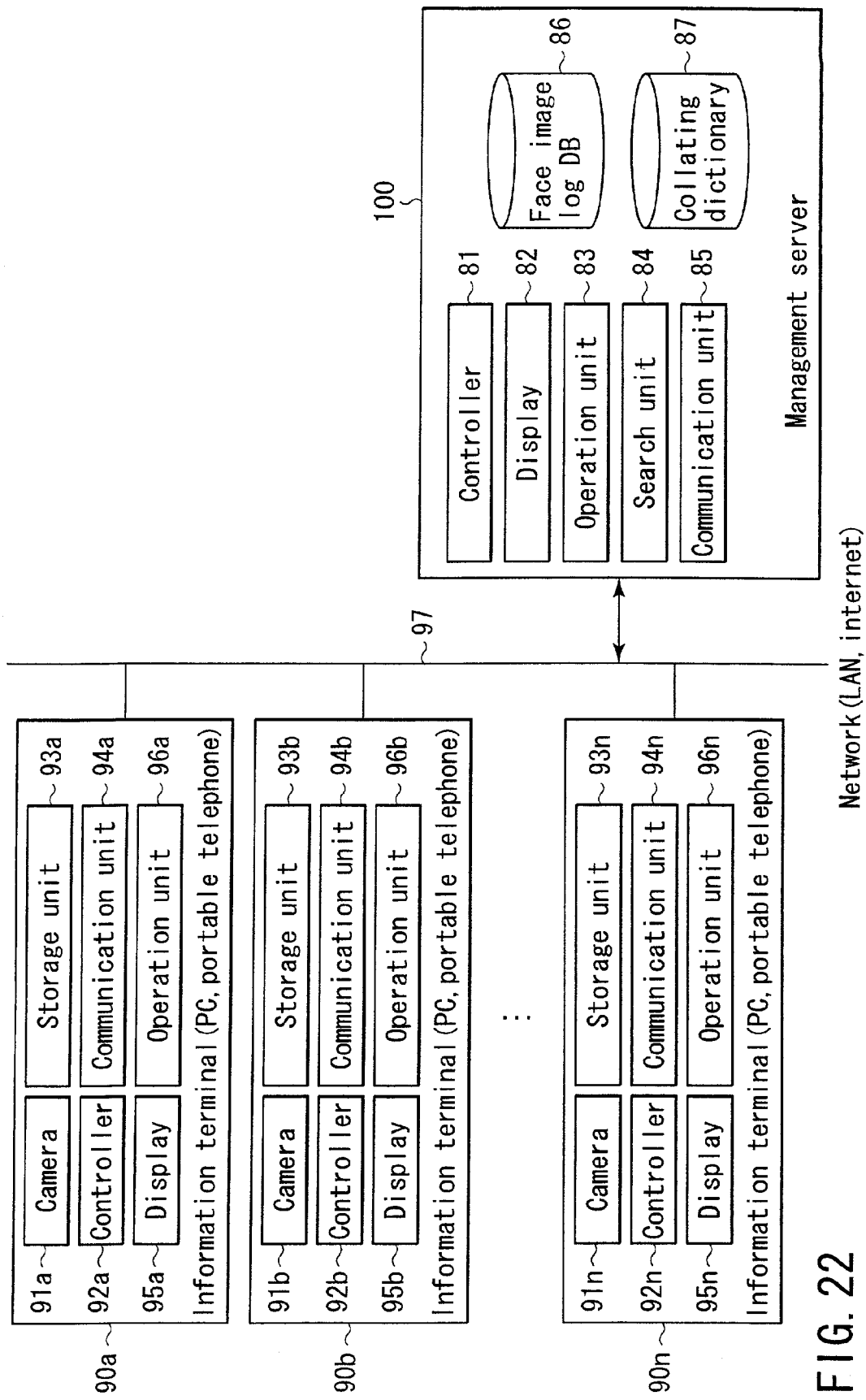
FIG. 22 is a block diagram schematically showing the configuration of an information management system according to the sixth embodiment.

FIG. 22 schematically shows the arrangement of the information management system of this sixth embodiment.

That is, in this information management system as shown in FIG. 22, information terminals (90a, 90b, ..., 90n) and a management server 100 are connected across a network 96. Each of the information terminals (90a, 90b, ..., 90n) is, e.g., a personal computer (PC) or portable telephone. These information terminals (90a, 90b, ..., 90n) have functions of performing a process of photographing a person's face, a process of extracting face feature amounts, a process of generating attribute information concerning an image, image processing for an image, and a posing detecting process, similar to the face image recording apparatuses explained in the first, second, and third embodiments. The network 96 is a LAN or the Internet.

The information terminals (90a, 90b, ..., 90n) include, e.g., cameras (91a, 91b, ..., 91n), controllers (92a, 92b, ..., 92n), storage units (93a, 93b, ..., 93n), communication units (94a, 94b, ..., 94n), displays (95a, 95b, ..., 95n), and operation units (96a, 96b, ..., 96n). The cameras (91a, 91b, ..., 91n) are digital cameras or the like. These cameras (91a, 91b, ..., 91n) photograph a person's face a plurality of number of times, similar to the cameras 2 of the face image recording apparatuses explained in the first and second embodiments. The cameras (91a, 91b, ..., 91n) can be connected to the main bodies of the information terminals (90a, 90b, ..., 90n) by radio communication or wire communication.

The controllers (92a, 92b, ..., 92n) control the overall information terminals. Also, these controllers (92a, 92b, ..., 92n) have functions similar to the processors 31 of the face image recording apparatuses explained in the first and second embodiments. Each function is realized when the controllers (92a, 92b, ..., 92n) operate on the basis of control programs stored in the storage units (93a, 93b, ..., 93n). For example, these controllers (92a, 92b, ..., 92n) can realize the functions of, e.g., a feature amount extractor, information generator, posing detector, and image processor.

The communication units (94a, 94b, ..., 94n) are network interfaces for connecting to the network 96. The information terminals (90a, 90b, ..., 90n) can communicate with the management server 100 by radio communication or wire communication.

The management server 100 has functions analogous to the management server 80 shown in FIG. 21. Therefore, the same reference numerals as in the management server 80 shown in FIG. 21 denote the same parts in FIG. 22, and a detailed description thereof will be omitted. Similar to the recorder 37 and the dictionary 38 described above, a face image recording DB 106 and a collating dictionary 107 can be installed in the management server 100 or in an external apparatus connectable across the network 96.

When an application program which achieves functions similar to the processor of the face image recording apparatus is installed in the management server 100, it is possible to realize a system in which the information terminal functions similar to the user interface unit 10 of the face image recording apparatus described above, and the management server 100 functions similar to the processor of the face image recording apparatus and the maintenance personal computer 43 shown in FIG. 15.

In the information management system configured as above, a face image can be recorded as information indicating a person's approval when various behaviors or activities (e.g., agreements to commercial transactions and contract items) in a world (cyber space) connected by a network such as a LAN or the Internet.

For example, in the information management system as described above a user can realize the following functions only by operating the information terminal.

(1) A function of recording a face image of the writer or sender when e-mail or an electronic document is written or sent. With this function, the writer or sender of e-mail or an electronic document can be identified by the face image. Therefore, it is possible to prevent unauthorized e-mail and electronic documents from suspicious persons and accomplish safe exchange of e-mail and electronic documents.

(2) A function of recording a face image of a person who has made a decision or approval. With this function, the face image of a person who has made a decision or approval can be recorded as a proof. This can improve the security of behaviors and activities in the cyber space.

Figure 23:
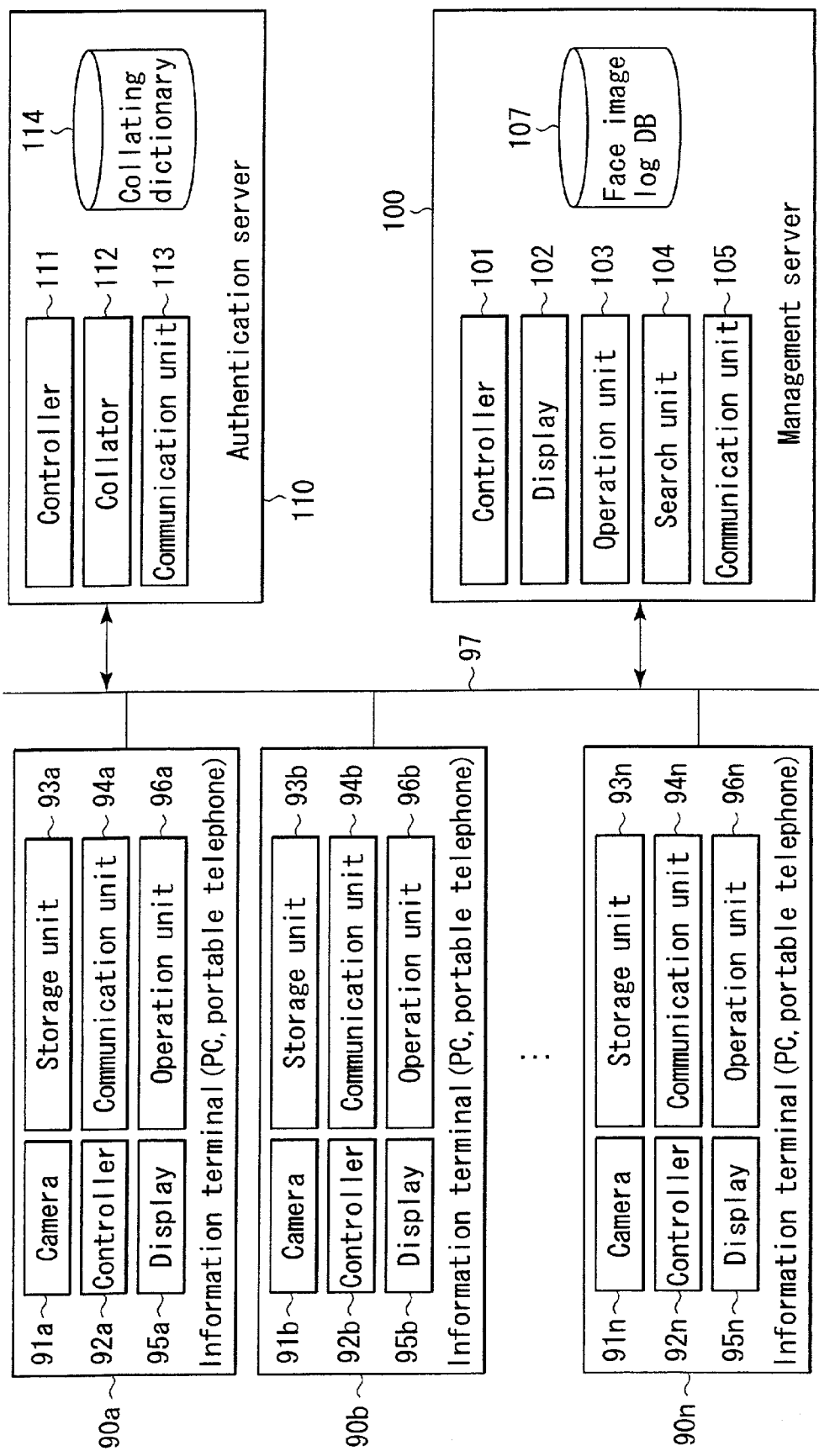
FIG. 23 is a block diagram schematically showing a modification of the information management system shown in FIG. 22.

FIG. 23 shows a modification of the information management system shown in FIG. 22. In this information management system shown in FIG. 23, a server (authentication server) 110 for authentication is added to the network 86 shown in FIG. 22. This authentication server 110 functions as an authenticating means for authenticating a user by face collation. In the thus configured information management system, the authentication server 110 performs a user authentication process on the basis of face images photographed by the information terminals (90a, 90b, ..., 90n). That is, the authentication server 110 authenticates a user by using a face image photographed by any of the information terminals (90a, 90b, ..., 90n). The result of the authentication process performed by the authentication server 110 can be transmitted to the management server 100 or returned to the corresponding one of the information terminals (90a, 90b, ..., 90n) which has photographed the image.

More specifically, in this configuration of the information management system shown in FIG. 23, the authentication server authenticates a face image photographed by each information terminal. In this manner, the authentication server ensures the validity of a face image photographed by each information terminal. Accordingly, a face image photographed by each information terminal can be authenticated efficiently and reliably. In addition, this authentication process is performed by the apparatus independent of the management server. Therefore, it is possible to reduce the installation cost of this information management system and improve the maintenance performance.

Figure 24:
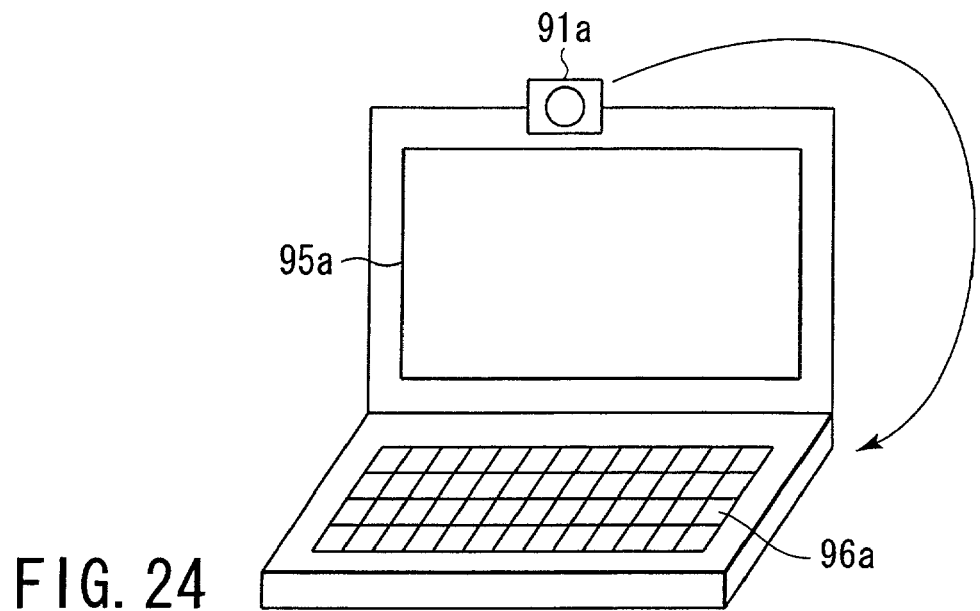
FIG. 24 is a view showing an example of information terminals shown in FIGS. 22 and 23.

FIG. 24 is a view showing an example of the information terminal 90a shown in FIG. 22 or 23. This information terminal 90a shown in FIG. 24 is obtained by connecting a camera 91a such as a digital camera to a notebook model personal computer (PC). The camera 91a is connected to the body of the notebook model PC by a USB cable or the like. The notebook model PC has a controller 92a, storage unit 93a, communication unit 94a, display 95a, and operation unit 96a. A wordprocessor application and an application for a face image extracting process are already installed in this notebook model PC.

Figure 25:
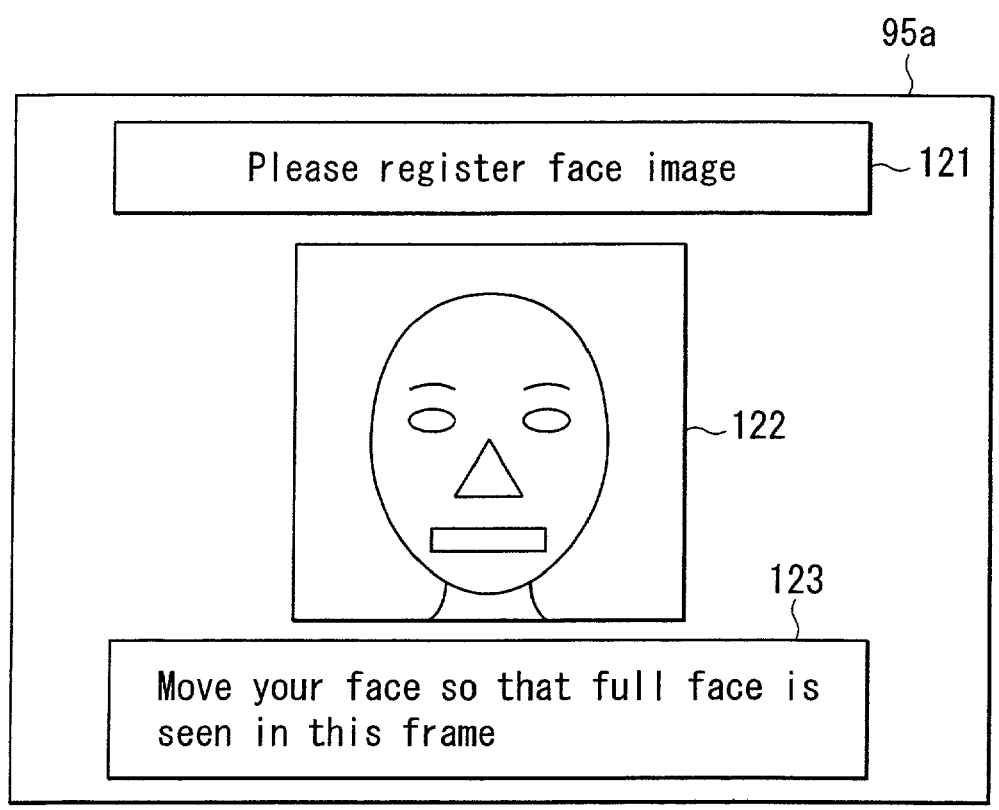
FIG. 25 is a view showing a display example of the information terminal.

FIG. 25 is a view showing a message window displayed on the display 95a when a user's face image is to be photographed. In this message window shown in FIG. 25, three display regions 121, 122, and 123 are displayed on the display screen.

The display region 121 displays a message indicating the content or purpose of processing. For example, this display region 121 displays a message "Please register face image" as a message indicating the content of processing.

The display region 122 displays an image currently being photographed by the camera 91a in real time. This clearly shows an appropriate face position to the user. This display region 122 is not limited to a rectangle but can be various shapes such as an ellipse.

The display region 123 displays a message indicating a motion required of the user. For example, this display region 123 displays a message "Move your face so that full face is seen in this frame" as a message indicating a motion required of the user.

A process of attaching a user's face image to a document will be explained below.

Figure 26:
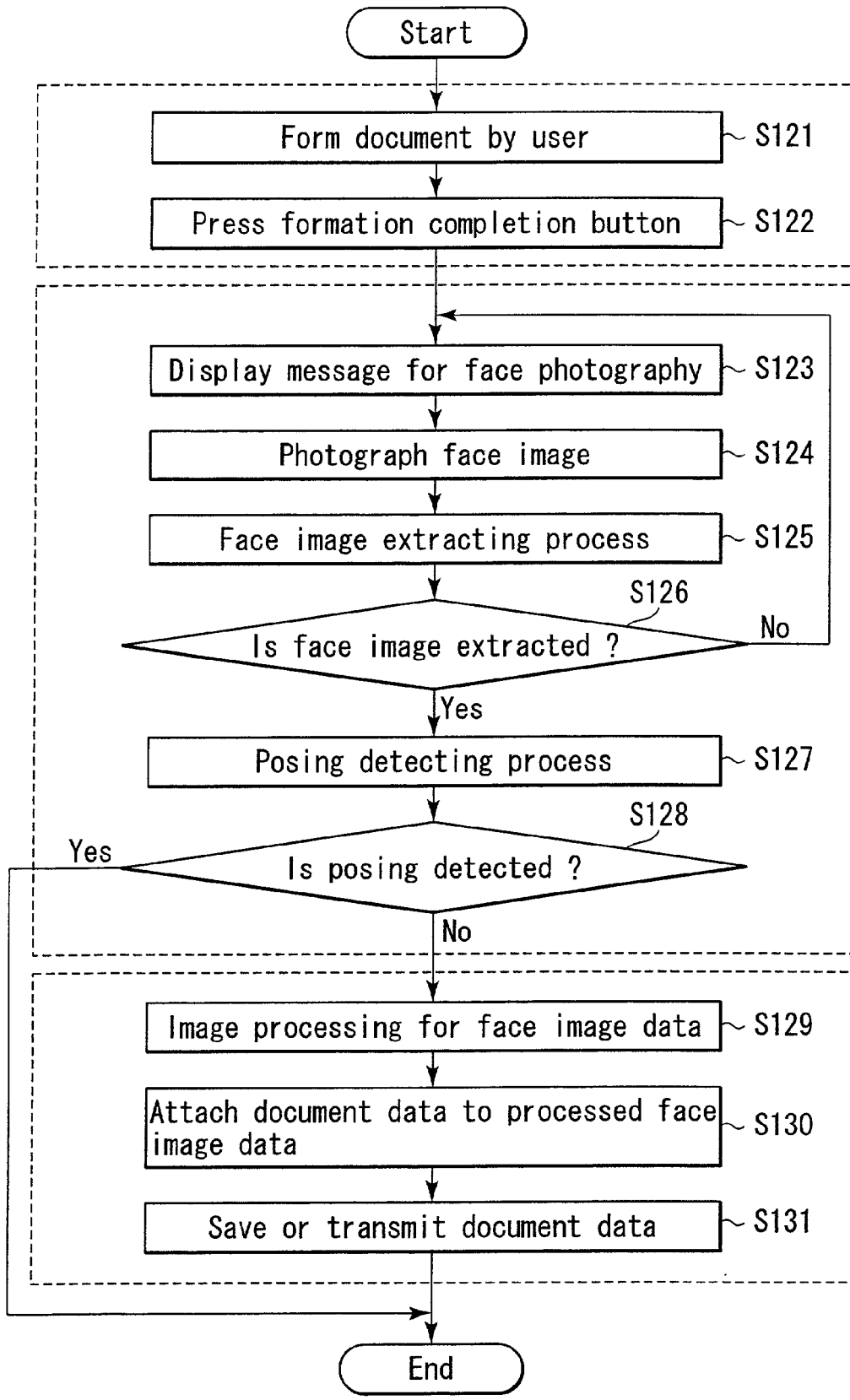
FIG. 26 is a flow chart of a process of attaching a face image to a document.

FIG. 26 is a flow chart showing for explaining the process of attaching a face image to a document (document data) formed by a user.

First, the user forms a document by the information terminal 90a (step S121). When completing the document, the user presses a document formation completion button (not shown) (step S122). When this document formation completion button is pressed, the controller 92a displays messages for the user as shown in FIG. 25 on the display 95a, in order to photograph a face image of the user (step S123). In accordance with these messages, the user intentionally turns his or her face toward the camera (step S124).

The controller 92a extracts a user's face image from the image photographed by the camera 91a (step S125). This face image extracting process is the same as steps S21 to S25 described earlier, so a detailed description thereof will be omitted.

If no face image is detected in the face image extracting process (NO in step S126), the controller 92a displays on the display 95a a message indicating that no face image is detected, and the flow returns to step S123. That is, if no face image is detected, the controller 92a reexecutes the face photographing process and the face image extracting process.

If a face image is detected in the face image extracting process (YES in step S126), the controller 92a performs a posing detecting process (step S127). This posing detecting process is the same as steps S111 to S116, so a detailed explanation thereof will be omitted.

If posing is detected in the posing detecting process (YES in step S128), the controller 92a forcedly terminates the processing. This can prevent registration of a face image impersonating another person. If no posing is detected in the posing detecting process (NO in step S128), the controller 92a determines that the face image can be registered.

When determining that the face image can be registered, the controller 92a performs image processing for data (face image data) of the face image extracted by the extracting process (step S129). In this image processing, data compression, encoding, encryption, and the like are performed. The conventional techniques can be used in these data compression, encoding, encryption, and the like.

The strength (encryption strength) of encryption in the encryption process is selected in accordance with the security level required by the user. For example, if face image data need not be encrypted, data compression and encoding are performed in the image processing without performing encryption.

When completing the image processing for the face image, the controller 92a attaches the processed face image data to the document data formed by the user (step S130). To save this document data having the face image attached, the controller 92a saves the document data having the face image attached into the storage unit 93a (step S131). To transmit the document as e-mail to another information terminal, the controller 92a causes the communication unit 94a to transmit the document data having the face image attached to the destination designated by the user (step S131).

As described above, document data is recorded after a face image of a user who has formed this document data is attached to the data. Since the writer of a document can be identified by his or her face image, the security of document data improves. For example, e-mail is transmitted by attaching a face image of the sender to the mail. This allows a recipient of the e-mail to identify the sender by the face image.

A process of making a decision or giving an approval for an application will be described below.

Figure 27:
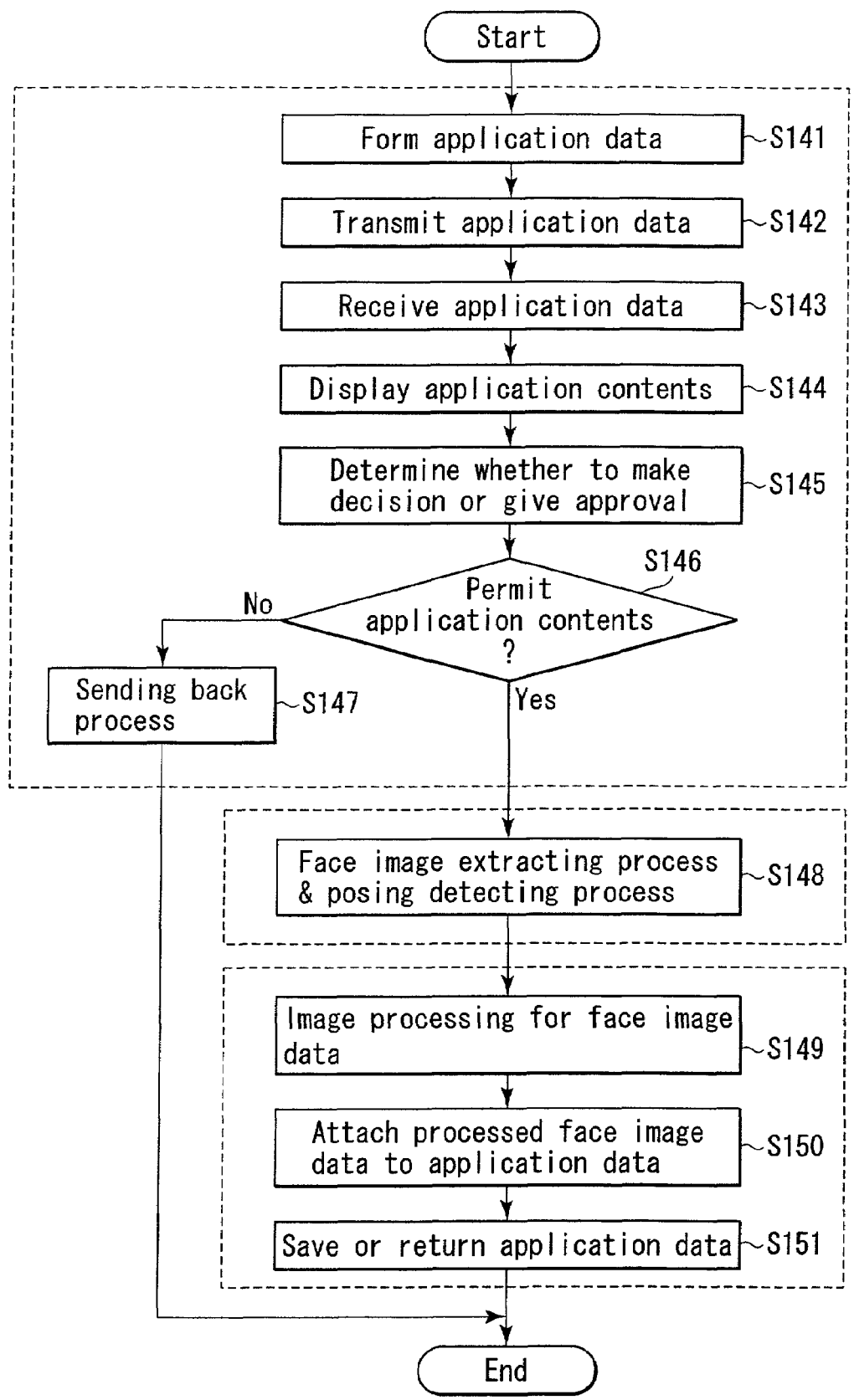
FIG. 27 is a flow chart of a process of attaching a face image to application data.

FIG. 27 is a flow chart for explaining the process of making a decision or giving an approval to an application. Assume that a certain user (applicant) operating the information terminal 90b is to obtain a decision or approval from another user (authorized person) operating the information terminal 90a. Assume also that the contents of an application are sent as application data to the authorized person.

First, the applicant forms application data on the information terminal 90b (step S141). The applicant then transmits the formed application data to the authorized person. Consequently, the application data is transmitted from the information terminal 90b operated by the applicant to the information terminal 90a operated by the authorized person (step S142).

Upon receiving the application data (step S143), the information terminal 90a displays the received application data on the display 95a (step S144). When the application data is displayed on the display 95a, the authorized person determines whether to make a decision or give an approval to the displayed application contents. The result of this determination is input from the operation unit by the authorized person (step S145).

For example, if determining that the application contents are impermissible (NO in step S146), the authorized person inputs from the operation unit 96a a message indicating that the application contents are rejected. Accordingly, the controller 92a executes a process of sending back the application contents (step S147). This sending back process is to notify the applicant of a message indicating that the authorized person regards the application contents as impermissible. For example, the sending back process returns the application data to the applicant by attaching information indicating disapproval to the application contents to the data. A process in step S148 (to be described later) may also be performed as this sending back process. In this process, information indicating disapproval to the application contents is notified to the applicant by attaching a face image of the authorized person to the information.

If determining that the application contents are permissible (YES in step S146), the authorized person inputs from the operation unit 96a a message indicating that the application contents are permitted. Consequently, the controller 92a executes a process of extracting a face image of the authorized person and a process of detecting posing with respect to the extracted face image (step S148). Note that these face image extracting process and posing detecting process are similar to steps S123 to S128 described above, so a detailed explanation thereof will be omitted.

When the face image of the authorized person is determined by the face image extracting process and posing detecting process described above, the controller 92a executes, as in step S129 described above, image processing for the face image (step S149). When this image processing for the face image is completed, as in steps S130 and S131 described above, the processed face image data is attached to the application data (step S150), and the application data is saved in the storage unit 93a (step S151). This application data having the face image data attached may also be returned to the applicant by the communication unit 94a.

As described above, application data is transmitted to an authorized person who makes a decision or gives an approval, and this authorized person makes a decision or gives an approval to the application data. A face image of an authorized person who has made a decision or given an approval is attached to application data which the authorized person regards as permissible. Consequently, a face image of an authorized person who has made a decision or given an approval to application contents can be recorded, and this improves the security.

When the operations in steps S121 to S131 or steps S141 to S151 are applied to an information management system having the configuration as shown in FIG. 23, the authentication server 110 may collate the extracted face image with the face image registered in the dictionary 114. In this case, face image data and information indicating a user authenticated by the authentication server 110 can be attached to a document or application data. This can further improve the security level.

To check the validity of a document or application contents to which face image data is attached, the face image attached to the document or application data is displayed on the display 102 of the management server 100. This allows a manager with a proper qualification to judge the validity of the document or application contents by checking the face image displayed on the display 102 of the management server 100.

To check the validity of a document or application contents, it is also possible to read out a face image attached to the document or application data, and collate the readout face image with the face image registered in the dictionary 114 of the authentication server 110, thereby identifying the user of the face image attached to the document or application data.

In this sixth embodiment as described above, when various behaviors or activities are performed in a network (cyber space) such as the Internet or a LAN, an information terminal with a camera, such as a personal computer or a portable terminal, is used to record a face image of an executer. This can realize, even in a cyber space, convenience equivalent to "impressing a seal" in the real world. In addition, a user-friendly information management system can be provided.

The present invention can be implemented by modifying and combining the embodiments without departing from the gist of each embodiment.

As described in detail above, the first to sixth embodiments can provide a face image recording apparatus, face image recording system, information management system, face image recording method, and information management method which minimize the system installation cost while maintaining a security level meeting an intended use, and which realize highly convenient person authentication which is readily used by a user.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A face image recording apparatus for recording a person's face image, comprising:
   a camera which photographs the face of a person a number of times;
   a feature point extractor which extracts a plurality of face feature points from each image photographed by said camera;
   a calculation unit which calculates an amount of relative change in each of the face feature points extracted by said feature point extractor, between each of the images;
   a posing detector which detects posing in accordance with face motion detected based on the amount of relative change in each of the face feature points, calculated by the calculation unit; and
   a memory which records at least one image from which said posing detector does not detect any posing by another person.

2. A an apparatus according to claim 1, which further comprises an authentication unit which authenticates the genuineness of a person by a method other than face image collation, and
   in which said camera photographs a plurality of number of times the face of a person authenticated by said authentication unit.

3. An apparatus according to claim 1, which further comprises a generator which generates attribute information concerning an image from which the face feature amount can be extracted by said feature amount extractor, and
   in which said memory records an image from which the face feature amount can be extracted by said feature amount extractor, in relation to attribute information generated by said generator and concerning the image.

4. An apparatus according to claim 1, wherein said feature amount extractor extracts one of a pupil, naris, and lip end point as the face feature amount, and
   said memory records an image from which one of the pupil, naris, and lip end point can be extracted by said feature amount extractor.

5. An apparatus according to claim 1, which further comprises an image processor which converts an image from which the face feature amount can be extracted by said feature amount extractor into an image to be recorded, and
   in which said memory records an image processed by said image processor.

6. An apparatus according to claim 5, wherein said image processor performs one of a face region extraction process, image density correction process, normalization process, or image compression process, as the image processing for an image from which the face feature amount can be extracted by said feature amount extractor.

7. An apparatus according to claim 1, wherein in the case where not less than a predetermined number of images from which the face feature amount can be extracted by said feature amount extractor exist in images photographed by said camera, at least one of the images from which the face feature amount can be extracted by said feature amount extractor is recorded.

8. An apparatus according to claim 1, further comprising a notification unit which, in the case where the number of images from which the face feature amount can be extracted by said feature amount extractor is not more than the predetermined number in images photographed by said camera, notifies a person of interest that recording of the face image photographed by said camera is unsuccessful or that photographing of the face image is attempted again.

9. An apparatus according to claim 1, wherein in the case where said feature amount extractor can extract, within a predetermined time, the face feature amount from at least one of the plurality of images photographed by said camera, said memory records at least one of the images from which the face feature amount can be extracted by said feature amount extractor.

10. An apparatus according to claim 1, further comprising a notification unit which, in the case where said feature amount extractor cannot extract, within a predetermined time, the face feature amount from any of the plurality of images photographed by said camera, notifies a person of interest that recording of the face image photographed by said camera is unsuccessful or that photographing of the face image is attempted again.

11. A face image recording apparatus for storing a person's face image, comprising:
   a camera which photographs the face of a person a plurality of number of times;
   a feature amount extractor which extracts a face feature amount from each image photographed by said camera;
   a generator which generates attribute information concerning an image from which the face feature amount is extracted by said feature amount extractor;
   a first memory which records an image from which the face feature amount is extracted by said feature amount extractor, in relation to attribute information concerning the image and generated by said generator;
   an input unit which inputs a search condition with respect to an image recorded in said first memory;
   a search unit which searches for an image recorded in said first memory, on the basis of the input search condition from said input unit and the attribute information recorded in said first memory;
   a second memory which records a person's face feature amount meeting a predetermined condition;
   a collator which calculates, with respect to an image found by said search unit, a collation degree between the face feature amount extracted by said feature amount extractor and the face feature amount recorded in said second memory; and
   an updating unit which, in the case where the collation degree calculated by said collator is a predetermined value, rewrites the face feature amount recorded in said second memory with the face feature amount extracted from the image found by said search unit.

12. An apparatus according to claim 11, further comprising a display which displays the image found by said search unit.

13. An apparatus according to claim 11, wherein said second memory records the face feature amount extracted by said feature amount extractor with respect to the image found by said search unit.

14. An information management system in which at least one terminal apparatus and a management apparatus are connected,
   said terminal apparatus comprising
   a camera which photographs the face of a person a plurality of number of times,
   a feature amount extractor which extracts a face feature amount from each image photographed by said camera, and
   a transmitter which transmits to said management apparatus an image from which the face feature amount is extracted by said feature amount extractor, and
   said management apparatus comprising
   a display which displays the image transmitted from said terminal apparatus,
   a generator which generates attribute information concerning an image from which the face feature amount is extracted by said feature amount extractor,
   a first memory which records an image from which the face feature amount is extracted by said feature amount extractor, in relation to attribute information concerning the image and generated by said generator,
   an input unit which inputs a search condition with respect to an image recorded in said first memory,
   a search unit which searches for an image recorded in said first memory, on the basis of the input search condition from said input unit and the attribute information recorded in said first memory,
   a second memory which records a person's face feature amount meeting a predetermined condition;
   a collator which calculates, with respect to an image found by said search unit, a collation degree between the face feature amount extracted by said feature amount extractor and the face feature amount recorded in said second memory; and
   an updating unit which, in the case where the collation degree calculated by said collator is a predetermined value, rewrites the face feature amount recorded in said second memory with the face feature amount extracted from the image found by said search unit.

15. A system according to claim 14, wherein said terminal apparatus further comprises a third memory which records an image from which the face feature amount is extracted by said feature amount extractor.

16. A system according to claim 14, wherein
   said terminal apparatus further comprises a third memory which records an image from which the face feature amount is extracted by said feature amount extractor, and a processor which, on the basis of an instruction from said management apparatus, switches a first operation mode in which an image photographed by said terminal apparatus is recorded in said third memory without transmitting the image to said management apparatus by said transmitter, and a second operation mode in which an image transmitted from said terminal apparatus by said transmitter is displayed on said display of said management apparatus, and
   said management apparatus further comprises a controller which instructs said terminal apparatus to set one of the first and second operation modes.

17. An information management system comprising a first information terminal which transmits electronic information, and a second information terminal which can receive the electronic information from said first information terminal,
   said first information terminal comprising
   a camera which photographs the face of a person a plurality of number of times,
   a feature amount extractor which extracts a face feature amount from each image photographed by said camera, and
   a transmitter which transmits to said second information terminal an image from which the face feature amount is extracted by said feature amount extractor, by attaching the image to electronic information,
   said first information terminal comprising
   a generator which generates attribute information concerning an image from which the face feature amount is extracted by said feature amount extractor, a first memory which records an image from which the face feature amount is extracted by said feature amount extractor, in relation to attribute information concerning the image and generated by said generator, an input unit which inputs a search condition with respect to an image recorded in said first memory, a search unit which searches for an image recorded in said first memory, on the basis of the input search condition from said input unit and the attribute information recorded in said first memory, a second memory which records a person's face feature amount meeting a predetermined condition;

a collator which calculates, with respect to an image found by said search unit, a collation degree between the face feature amount extracted by said feature amount extractor and the face feature amount recorded in said second memory, and an updating unit which, in the case where the collation degree calculated by said collator is a predetermined value, rewrites the face feature amount recorded in said second memory with the face feature amount extracted from the image found by said search unit.

18. An information management system comprising a first information terminal which transmits electronic information, a second information terminal which can receive the electronic information from said first information terminal, and an authentication apparatus connected to one of said first and second information terminals, said first information terminal comprising a camera which photographs the face of a person a plurality of number of times, a feature amount extractor which extracts a face feature amount from each image photographed by said camera, and a transmitter which transmits to said second information terminal an image from which the face feature amount is extracted by said feature amount extractor, by attaching the image to electronic information, and said authentication apparatus comprising a first memory in which face images of a plurality of persons are recorded beforehand, a first collator which collates an image attached to electronic information transmitted from said first information terminal to said second information terminal, with a face image stored in said first memory, and a notification unit which, in the case where the collation by said collator is successful, notifies said second information terminal that the sender of the electronic information is authenticated, and, in the case where the collation by said first collator is unsuccessful, notifies said second information terminal that the sender of the electronic information cannot be authenticated, a generator which generates attribute information concerning an image from which the face feature amount is extracted by said feature amount extractor, a second memory which records an image from which the face feature amount is extracted by said feature amount extractor, in relation to attribute information concerning the image and generated by said generator, an input unit which inputs a search condition with respect to an image recorded in said second memory, a search unit which searches for an image recorded in said first memory, on the basis of the input search condition from said input unit and the attribute information recorded in said second memory, a second collator which calculates, with respect to an image found by said search unit, a collation degree between the face feature amount extracted by said feature amount extractor and the face feature amount recorded in said first memory, and an updating unit which, in the case where the collation degree calculated by said second collator is a predetermined value, rewrites the face feature amount recorded in said first memory with the face feature amount extracted from the image found by said search unit.

19. An information management system comprising a first information terminal which performs application requiring a decision by an authorized person, and a second information terminal which the authorized person can operate, said first information terminal comprising a transmitter which transmits, to said second information terminal, application data indicating application contents requiring a decision by the authorized person, and said second information terminal comprising a display which displays the application contents of the application data transmitted from said first information terminal, a camera which, in the case where the authorized person permits the application contents displayed on said display, photographs the face of the authorized person a plurality of number of times, a feature amount extractor which extracts a face feature amount from each image photographed by said camera, and a returning unit which returns the application data to said first information terminal by attaching to the application data an image from which the face feature amount is extracted by said feature amount extractor.

20. An information management system comprising a first information terminal which performs application requiring a decision by an authorized person, a second information terminal which the authorized person can operate, and an authentication apparatus connected to one of said first and second information terminals, said first information terminal comprising a transmitter which transmits, to said second information terminal, application data indicating application contents requiring a decision by the authorized person, said second information terminal comprising a display which displays the application contents of the application data transmitted from said first information terminal, a camera which, in the case where the authorized person permits the application contents displayed on said display, photographs the face of the authorized person a plurality of number of times, a feature amount extractor which extracts a face feature amount from each image photographed by said camera, and a returning unit which returns the application data to said first information terminal by attaching to the application data an image from which the face feature amount is extracted by said feature amount extractor, and said authentication apparatus comprising a memory in which face images of a plurality of persons are recorded beforehand, a collator which collates the image attached to the application data transmitted from said second information terminal to said first information terminal, with a face image stored in said memory, and a notification unit which, in the case where the collation by said collator is successful, notifies said first information terminal that the image attached to the application data is identified as the authorized person, and, in the case where the collation by said collator is unsuccessful, notifies said first information terminal that the image attached to the application data cannot be identified as the authorized person.

21. A face image recording method of recording a person's face image, comprising:
photographing the face of a person a number of times by a camera;
extracting a plurality of face feature points from each image photographed by the camera;
calculating an amount of relative change in each of the face feature points extracted by the feature point extractor, between each of the images;
detecting posing in accordance with face motion detected based on the amount of relative change in each of the face feature points; and
recording into a memory at least one image in which posing by another person is not detected.

22. A face image recording method of storing a person's face image, comprising:
photographing the face of a person a plurality of number of times by a camera;
extracting a face feature amount from each image photographed by the camera;
generating attribute information concerning an image from which the face feature amount is extracted;
recording into a first memory an image from which the face feature amount is extracted, in relation to attribute information concerning the image;
inputting a search condition with respect to an image recorded in the first memory;
searching for an image recorded in the first memory, on the basis of the input search condition and the attribute information recorded in the first memory;
recording into a second memory a person's face feature amount meeting a predetermined condition;
calculating a collation degree between the extracted face feature amount and the face feature amount recorded in the second memory; and
rewriting the face feature amount recorded in the second memory with the extracted face feature amount when the collation degree is a predetermined value.

23. A face image recording method of storing a person's face image, comprising:
photographing the face of a person a plurality of number of times by a camera;
extracting a face feature amount from each image photographed by the camera;
generating attribute information concerning an image from which the face feature amount is extracted;
recording into a first memory an image from which the face feature amount is extracted, in relation to attribute information concerning the image;
inputting a search condition with respect to an image recorded in the first memory;
searching for an image recorded in the first memory, on the basis of the input search condition and the attribute information recorded in the first memory;
calculating a collation degree between a face feature amount extracted from an image found by the search and a face feature amount recorded beforehand in a second memory; and
rewriting, in the case where the collation degree is a predetermined value, the face feature amount recorded in the second memory with the face feature amount extracted from the found image.

24. An information management method used for at least one terminal apparatus and a management apparatus, comprising:
photographing the face of a person a plurality of number of times by a camera of the terminal apparatus;
extracting a face feature amount from each image photographed by the camera;
transmitting from the terminal apparatus to the management apparatus an image from which the face feature amount is extracted;
displaying on the management apparatus the image transmitted from the terminal apparatus;
generating attribute information concerning an image from which the face feature amount is extracted;
recording into a first memory an image from which the face feature amount is extracted, in relation to generated attribute information concerning the image; and
inputting a search condition with respect to an image recorded in the first memory;
searching for an image recorded in the first memory, on the basis of the input search condition and the attribute information recorded in the first memory,
recording into a second memory a person's face feature amount meeting a predetermined condition;
calculating a collation degree between the extracted face feature amount and the face feature amount recorded in the second memory; and
rewriting the face feature amount recorded in the second memory with the extracted face feature amount when the collation degree is a predetermined value.

25. An information management method used for a first information terminal which transmits electronic information, and a second information terminal which can receive the electronic information from the first information terminal, comprising:
photographing a plurality of number of times the face of a person who transmits electronic information, by a camera of the first information terminal;
extracting a face feature amount from each image photographed by the camera;
transmitting an image from which the face feature amount is extracted, by attaching the image to electronic information, from the first information terminal to the second information terminal;
generating attribute information concerning an image from which the face feature amount is extracted;
recording into a first memory an image from which the face feature amount is extracted, in relation to generated attribute information concerning the image and generated;
inputting a search condition with respect to an image recorded in the first memory;
searching for an image recorded in the first memory, on the basis of the input search condition and the attribute information recorded in said first memory;
recording into a second memory a person's face feature amount meeting a predetermined condition;
calculating, with respect to an image, a collation degree between the extracted face feature amount and the face feature amount recorded in said second memory, and
rewriting the face feature amount recorded in the second memory with the extracted face feature amount when the collation degree is a predetermined value.

26. An information management method used for a first information terminal which performs application requiring a decision by an authorized person, and a second information terminal which the authorized person can operate, comprising:

transmitting, from the first information terminal to the second information terminal, application data indicating application contents requiring a decision by the authorized person;

displaying, on the second information terminal, the application contents of the application data transmitted from the first information terminal;

photographing the face of the authorized person a plurality of number of times in the case where the authorized person permits the displayed application contents;

extracting a face feature amount from each photographed image; and returning the application data from the second information terminal to the first information terminal by attaching to the application data an image from which the face feature amount is extracted.

27. An information management method used with first and second information terminals and an authentication apparatus, comprising:

photographing the face of a person a number of times;

extracting a face feature amount from each photographed image;

transmitting to the second information terminal an image from which the face feature amount is extracted, by attaching the image to electronic information;

recording in a first memory face images of a plurality of persons, collating an image attached to electronic information transmitted from the first information terminal to the second information terminal, with a face image stored in the first memory;

notifying, in the case where the collation is successful, the second information terminal that the sender of the electronic information is authenticated, and, in the case where the collation by the first collator is unsuccessful, notifying the second information terminal that the sender of the electronic information cannot be authenticated;

generating attribute information concerning an image from which the face feature amount is extracted;

recording into a second memory an image from which the face feature amount is extracted, in relation to generated attribute information concerning the image;

inputting a search condition with respect to an image recorded in the second memory;

searching for an image recorded in the first memory, on the basis of the input search condition and the attribute information recorded in the second memory;

calculating, with respect to an image, a collation degree between the extracted face feature amount and the face feature amount recorded in the first memory; and rewriting the face feature amount recorded in the first memory with the extracted face feature amount when the calculated collation degree is a predetermined value.

* * * * *